US011164548B2

(12) United States Patent
Bloch et al.

(10) Patent No.: US 11,164,548 B2
(45) Date of Patent: Nov. 2, 2021

(54) INTELLIGENT BUFFERING OF LARGE-SCALE VIDEO

(71) Applicant: JBF Interlude 2009 Ltd., Tel Aviv-Jaffa (IL)

(72) Inventors: Jonathan Bloch, Brooklyn, NY (US); Barak Feldman, Tenafly, NJ (US); Tal Zubalsky, Brooklyn, NY (US); Yuval Hofshy, Kfar Saba (IL); Alon Benari, Brooklyn, NY (US)

(73) Assignee: JBF Interlude 2009 LTD, Tel Aviv (IL)

( * ) Notice: Subject to any disclaimer, the term of this patent is extended or adjusted under 35 U.S.C. 154(b) by 0 days.

(21) Appl. No.: 14/978,464

(22) Filed: Dec. 22, 2015

(65) Prior Publication Data

US 2017/0178601 A1     Jun. 22, 2017

(51) Int. Cl.
    *G09G 5/395*       (2006.01)
    *G06F 3/01*         (2006.01)
    (Continued)

(52) U.S. Cl.
    CPC ............ *G09G 5/395* (2013.01); *G06F 3/012* (2013.01); *G06F 3/013* (2013.01); *G06F 3/017* (2013.01);
    (Continued)

(58) Field of Classification Search
    CPC .............. G09G 5/395; G09G 2354/00; G09G 2360/127; G09G 5/14; G06F 3/012;
    (Continued)

(56) References Cited

U.S. PATENT DOCUMENTS

| 4,569,026 A | 2/1986 | Best |
| 5,161,034 A | 11/1992 | Klappert |

(Continued)

FOREIGN PATENT DOCUMENTS

| CA | 2639491 A1 | 3/2010 |
| DE | 004038801 A1 | 6/1992 |

(Continued)

OTHER PUBLICATIONS

An ffmpeg and SDL Tutorial, "Tutorial 05: Synching Video," Retrieved from internet on Mar. 15, 2013: <http://dranger.com/ffmpeg/tutorial05.html>, (4 pages).

(Continued)

*Primary Examiner* — Matthew K Kwan
(74) *Attorney, Agent, or Firm* — Goodwin Procter LLP

(57) ABSTRACT

In a method and supporting system for intelligent buffering of large scale videos, a video presentation includes a plurality of sub-videos, each associated with a field of view. During presentation of the large scale video, sub-videos within a user's field of view are loaded and presented to the user, and sub-videos in proximate fields of view are loaded for potential presentation. On identifying a change in the user's field of view to one of the proximate fields of view, sub-videos are loaded for presentation within the new field of view. In a method and supporting system for seamless transitions in large scale videos, a video having a plurality of sub-videos is provided for presentation to a user, and distraction levels based on video content and user interactions are tracked. A transition point for the video is identified based on one or both distraction levels, and a sub-video is changed to a different sub-video at the transition point.

28 Claims, 13 Drawing Sheets

(51) Int. Cl.
  *G09G 5/14* (2006.01)
  *G06F 3/147* (2006.01)

(52) U.S. Cl.
  CPC .............. *G06F 3/147* (2013.01); *G09G 5/14* (2013.01); *G09G 2354/00* (2013.01); *G09G 2360/127* (2013.01)

(58) Field of Classification Search
  CPC .......... G06F 3/013; G06F 3/147; G06F 3/017; H04N 13/0044; G06T 13/80; G11B 27/00
  USPC ..................................................... 348/39, 51
  See application file for complete search history.

(56) References Cited

U.S. PATENT DOCUMENTS

| | | | |
|---|---|---|---|
| 5,568,602 A | 10/1996 | Callahan et al. | |
| 5,568,603 A | 10/1996 | Chen et al. | |
| 5,597,312 A | 1/1997 | Bloom et al. | |
| 5,607,356 A | 3/1997 | Schwartz | |
| 5,610,653 A | 3/1997 | Abecassis | |
| 5,636,036 A | 6/1997 | Ashbey | |
| 5,676,551 A | 10/1997 | Knight et al. | |
| 5,715,169 A | 2/1998 | Noguchi | |
| 5,734,862 A | 3/1998 | Kulas | |
| 5,737,527 A | 4/1998 | Shiels et al. | |
| 5,745,738 A | 4/1998 | Ricard | |
| 5,751,953 A | 5/1998 | Shiels et al. | |
| 5,754,770 A | 5/1998 | Shiels et al. | |
| 5,818,435 A | 10/1998 | Kozuka et al. | |
| 5,848,934 A | 12/1998 | Shiels et al. | |
| 5,887,110 A | 3/1999 | Sakamoto et al. | |
| 5,894,320 A | 4/1999 | Vancelette | |
| 5,956,037 A | 9/1999 | Osawa et al. | |
| 6,067,400 A | 5/2000 | Saeki et al. | |
| 6,122,668 A | 9/2000 | Teng et al. | |
| 6,128,712 A | 10/2000 | Hunt et al. | |
| 6,191,780 B1 | 2/2001 | Martin et al. | |
| 6,222,925 B1 | 4/2001 | Shiels et al. | |
| 6,240,555 B1 | 5/2001 | Shoff et al. | |
| 6,298,482 B1 | 10/2001 | Seidman et al. | |
| 6,460,036 B1 | 10/2002 | Herz | |
| 6,535,639 B1 | 3/2003 | Uchihachi et al. | |
| 6,657,906 B2 | 12/2003 | Martin | |
| 6,698,020 B1 | 2/2004 | Zigmond et al. | |
| 6,728,477 B1 | 4/2004 | Watkins | |
| 6,771,875 B1 | 8/2004 | Kunieda et al. | |
| 6,801,947 B1 | 10/2004 | Li | |
| 6,947,966 B1 | 9/2005 | Oko, Jr. et al. | |
| 7,085,844 B2 | 8/2006 | Thompson | |
| 7,155,676 B2 | 12/2006 | Land et al. | |
| 7,231,132 B1 | 6/2007 | Davenport | |
| 7,310,784 B1 | 12/2007 | Gottlieb et al. | |
| 7,379,653 B2 | 5/2008 | Yap et al. | |
| 7,444,069 B1 | 10/2008 | Bernsley | |
| 7,472,910 B1 | 1/2009 | Okada et al. | |
| 7,627,605 B1 | 12/2009 | Lamere et al. | |
| 7,669,128 B2 | 2/2010 | Bailey et al. | |
| 7,694,320 B1 | 4/2010 | Yeo et al. | |
| 7,779,438 B2 | 8/2010 | Davies | |
| 7,787,973 B2 | 8/2010 | Lambert | |
| 7,917,505 B2 | 3/2011 | van Gent et al. | |
| 8,024,762 B2 | 9/2011 | Britt | |
| 8,046,801 B2 | 10/2011 | Ellis et al. | |
| 8,065,710 B2 | 11/2011 | Malik | |
| 8,151,139 B1 | 4/2012 | Gordon | |
| 8,176,425 B2 | 5/2012 | Wallace et al. | |
| 8,190,001 B2 | 5/2012 | Bernsley | |
| 8,276,058 B2 | 9/2012 | Gottlieb et al. | |
| 8,281,355 B1 | 10/2012 | Weaver et al. | |
| 8,350,908 B2 * | 1/2013 | Morris ............... | G06K 9/00771 348/143 |
| 8,600,220 B2 | 12/2013 | Bloch et al. | |
| 8,612,517 B1 | 12/2013 | Yadid et al. | |
| 8,626,337 B2 | 1/2014 | Corak et al. | |
| 8,650,489 B1 | 2/2014 | Baum et al. | |
| 8,667,395 B2 | 3/2014 | Hosogai et al. | |
| 8,750,682 B1 | 6/2014 | Nicksay et al. | |
| 8,752,087 B2 | 6/2014 | Begeja et al. | |
| 8,826,337 B2 | 9/2014 | Issa et al. | |
| 8,860,882 B2 | 10/2014 | Bloch et al. | |
| 8,930,975 B2 | 1/2015 | Woods et al. | |
| 8,977,113 B1 | 3/2015 | Rumteen et al. | |
| 9,009,619 B2 | 4/2015 | Bloch et al. | |
| 9,021,537 B2 | 4/2015 | Funge et al. | |
| 9,082,092 B1 | 7/2015 | Henry | |
| 9,094,718 B2 | 7/2015 | Barton et al. | |
| 9,190,110 B2 | 11/2015 | Bloch | |
| 9,257,148 B2 | 2/2016 | Bloch et al. | |
| 9,268,774 B2 | 2/2016 | Kim et al. | |
| 9,271,015 B2 | 2/2016 | Bloch et al. | |
| 9,363,464 B2 | 6/2016 | Alexander | |
| 9,367,196 B1 | 6/2016 | Goldstein et al. | |
| 9,374,411 B1 | 6/2016 | Goetz | |
| 9,390,099 B1 | 7/2016 | Wang et al. | |
| 9,456,247 B1 | 9/2016 | Pontual et al. | |
| 9,465,435 B1 | 10/2016 | Zhang et al. | |
| 9,473,582 B1 | 10/2016 | Fraccaroli | |
| 9,510,044 B1 | 11/2016 | Pereira et al. | |
| 9,520,155 B2 | 12/2016 | Bloch et al. | |
| 9,530,454 B2 | 12/2016 | Bloch et al. | |
| 9,538,219 B2 | 1/2017 | Sakata et al. | |
| 9,571,877 B2 | 2/2017 | Lee et al. | |
| 9,607,655 B2 | 3/2017 | Bloch et al. | |
| 9,641,898 B2 | 5/2017 | Bloch et al. | |
| 9,653,115 B2 | 5/2017 | Bloch et al. | |
| 9,653,116 B2 | 5/2017 | Paulraj et al. | |
| 9,715,901 B1 | 7/2017 | Singh et al. | |
| 9,736,503 B1 | 8/2017 | Bakshi et al. | |
| 9,792,026 B2 | 10/2017 | Bloch et al. | |
| 9,792,957 B2 | 10/2017 | Bloch et al. | |
| 9,826,285 B1 | 11/2017 | Mishra et al. | |
| 9,967,621 B2 | 5/2018 | Armstrong et al. | |
| 10,178,304 B1 | 1/2019 | Tudor et al. | |
| 10,178,421 B2 | 1/2019 | Thomas et al. | |
| 10,194,189 B1 | 1/2019 | Goetz et al. | |
| 10,257,572 B2 | 4/2019 | Manus et al. | |
| 10,419,790 B2 | 9/2019 | Gersten | |
| 10,460,765 B2 | 10/2019 | Bloch et al. | |
| 10,523,982 B2 | 12/2019 | Oyman | |
| 2001/0056427 A1 | 12/2001 | Yoon et al. | |
| 2002/0019799 A1 | 2/2002 | Ginsberg et al. | |
| 2002/0053089 A1 | 5/2002 | Massey | |
| 2002/0086724 A1 | 7/2002 | Miyaki et al. | |
| 2002/0091455 A1 | 7/2002 | Williams | |
| 2002/0105535 A1 | 8/2002 | Wallace et al. | |
| 2002/0106191 A1 | 8/2002 | Betz et al. | |
| 2002/0120456 A1 | 8/2002 | Berg et al. | |
| 2002/0120931 A1 | 8/2002 | Huber et al. | |
| 2002/0124250 A1 | 9/2002 | Proehl et al. | |
| 2002/0129374 A1 | 9/2002 | Freeman et al. | |
| 2002/0140719 A1 | 10/2002 | Amir et al. | |
| 2002/0144262 A1 | 10/2002 | Plotnick et al. | |
| 2002/0174430 A1 | 11/2002 | Ellis et al. | |
| 2002/0177914 A1 | 11/2002 | Chase | |
| 2002/0194595 A1 | 12/2002 | Miller et al. | |
| 2003/0007560 A1 * | 1/2003 | Mayhew ................ | G06T 7/20 375/240.08 |
| 2003/0012409 A1 | 1/2003 | Overton et al. | |
| 2003/0020744 A1 | 1/2003 | Ellis et al. | |
| 2003/0023757 A1 | 1/2003 | Ishioka et al. | |
| 2003/0039471 A1 | 2/2003 | Hashimoto | |
| 2003/0076347 A1 | 4/2003 | Barrett et al. | |
| 2003/0101164 A1 | 5/2003 | Pic et al. | |
| 2003/0148806 A1 | 8/2003 | Weiss | |
| 2003/0159566 A1 | 8/2003 | Sater et al. | |
| 2003/0183064 A1 | 10/2003 | Eugene et al. | |
| 2003/0184598 A1 | 10/2003 | Graham | |
| 2003/0221541 A1 | 12/2003 | Platt | |
| 2004/0009813 A1 | 1/2004 | Wind | |
| 2004/0019905 A1 | 1/2004 | Fellenstein et al. | |
| 2004/0034711 A1 | 2/2004 | Hughes | |
| 2004/0070595 A1 | 4/2004 | Atlas et al. | |
| 2004/0091848 A1 | 5/2004 | Nemitz | |

(56) References Cited

U.S. PATENT DOCUMENTS

| | | |
|---|---|---|
| 2004/0128317 A1 | 7/2004 | Sull et al. |
| 2004/0138948 A1 | 7/2004 | Loomis |
| 2004/0146275 A1 | 7/2004 | Takata et al. |
| 2004/0172476 A1 | 9/2004 | Chapweske |
| 2004/0194128 A1 | 9/2004 | McIntyre et al. |
| 2004/0194131 A1 | 9/2004 | Ellis et al. |
| 2004/0199923 A1 | 10/2004 | Russek |
| 2005/0019015 A1 | 1/2005 | Ackley et al. |
| 2005/0055377 A1 | 3/2005 | Dorey et al. |
| 2005/0091597 A1 | 4/2005 | Ackley |
| 2005/0102707 A1 | 5/2005 | Schnitman |
| 2005/0107159 A1 | 5/2005 | Sato |
| 2005/0120389 A1 | 6/2005 | Boss et al. |
| 2005/0132401 A1 | 6/2005 | Boccon-Gibod et al. |
| 2005/0166224 A1 | 7/2005 | Ficco |
| 2005/0198661 A1* | 9/2005 | Collins .................. G09F 27/00 725/19 |
| 2005/0210145 A1 | 9/2005 | Kim et al. |
| 2005/0251820 A1 | 11/2005 | Stefanik et al. |
| 2005/0251827 A1 | 11/2005 | Ellis et al. |
| 2006/0002895 A1 | 1/2006 | McDonnell et al. |
| 2006/0024034 A1 | 2/2006 | Filo et al. |
| 2006/0028951 A1 | 2/2006 | Tozun et al. |
| 2006/0064733 A1 | 3/2006 | Norton et al. |
| 2006/0120624 A1 | 6/2006 | Jojic et al. |
| 2006/0150072 A1 | 7/2006 | Salvucci |
| 2006/0150216 A1 | 7/2006 | Herz et al. |
| 2006/0153537 A1 | 7/2006 | Kaneko et al. |
| 2006/0155400 A1 | 7/2006 | Loomis |
| 2006/0200842 A1 | 9/2006 | Chapman et al. |
| 2006/0222322 A1 | 10/2006 | Levitan |
| 2006/0224260 A1 | 10/2006 | Hicken et al. |
| 2006/0274828 A1 | 12/2006 | Siemens et al. |
| 2007/0003149 A1 | 1/2007 | Nagumo et al. |
| 2007/0024706 A1 | 2/2007 | Brannon et al. |
| 2007/0033633 A1 | 2/2007 | Andrews et al. |
| 2007/0055989 A1 | 3/2007 | Shanks et al. |
| 2007/0079325 A1 | 4/2007 | de Heer |
| 2007/0085759 A1 | 4/2007 | Lee et al. |
| 2007/0099684 A1 | 5/2007 | Butterworth |
| 2007/0101369 A1 | 5/2007 | Dolph |
| 2007/0118801 A1 | 5/2007 | Harshbarger et al. |
| 2007/0154169 A1 | 7/2007 | Cordray et al. |
| 2007/0157234 A1 | 7/2007 | Walker |
| 2007/0157260 A1 | 7/2007 | Walker |
| 2007/0157261 A1 | 7/2007 | Steelberg et al. |
| 2007/0162395 A1 | 7/2007 | Ben-Yaacov et al. |
| 2007/0220583 A1 | 9/2007 | Bailey et al. |
| 2007/0226761 A1 | 9/2007 | Zalewski et al. |
| 2007/0239754 A1 | 10/2007 | Schnitman |
| 2007/0253677 A1 | 11/2007 | Wang |
| 2007/0253688 A1 | 11/2007 | Koennecke |
| 2007/0263722 A1 | 11/2007 | Fukuzawa |
| 2008/0019445 A1 | 1/2008 | Aono et al. |
| 2008/0021187 A1 | 1/2008 | Wescott et al. |
| 2008/0021874 A1 | 1/2008 | Dahl et al. |
| 2008/0022320 A1 | 1/2008 | Ver Steeg |
| 2008/0031595 A1 | 2/2008 | Cho |
| 2008/0086456 A1 | 4/2008 | Rasanen et al. |
| 2008/0086754 A1 | 4/2008 | Chen et al. |
| 2008/0091721 A1 | 4/2008 | Harboe et al. |
| 2008/0092159 A1 | 4/2008 | Dmitriev et al. |
| 2008/0148152 A1 | 6/2008 | Blinnikka et al. |
| 2008/0170687 A1 | 7/2008 | Moors et al. |
| 2008/0177893 A1 | 7/2008 | Bowra et al. |
| 2008/0178232 A1 | 7/2008 | Velusamy |
| 2008/0276157 A1 | 11/2008 | Kustka et al. |
| 2008/0300967 A1 | 12/2008 | Buckley et al. |
| 2008/0301750 A1 | 12/2008 | Silfvast et al. |
| 2008/0314232 A1 | 12/2008 | Hansson et al. |
| 2009/0022015 A1 | 1/2009 | Harrison |
| 2009/0022165 A1 | 1/2009 | Candelore et al. |
| 2009/0024923 A1 | 1/2009 | Hartwig et al. |
| 2009/0029771 A1 | 1/2009 | Donahue |
| 2009/0055880 A1 | 2/2009 | Batteram et al. |
| 2009/0063681 A1 | 3/2009 | Ramakrishnan et al. |
| 2009/0077137 A1 | 3/2009 | Weda et al. |
| 2009/0079663 A1 | 3/2009 | Chang et al. |
| 2009/0083631 A1 | 3/2009 | Sidi et al. |
| 2009/0116817 A1 | 5/2009 | Kim et al. |
| 2009/0177538 A1 | 7/2009 | Brewer et al. |
| 2009/0191971 A1 | 7/2009 | Avent |
| 2009/0195652 A1* | 8/2009 | Gal .......................... B60R 1/00 348/148 |
| 2009/0199697 A1 | 8/2009 | Lehtiniemi et al. |
| 2009/0226046 A1 | 9/2009 | Shteyn |
| 2009/0228572 A1 | 9/2009 | Wall et al. |
| 2009/0254827 A1 | 10/2009 | Gonze et al. |
| 2009/0258708 A1 | 10/2009 | Figueroa |
| 2009/0265746 A1 | 10/2009 | Halen et al. |
| 2009/0297118 A1 | 12/2009 | Fink et al. |
| 2009/0320075 A1 | 12/2009 | Marko |
| 2010/0017820 A1 | 1/2010 | Thevathasan et al. |
| 2010/0042496 A1 | 2/2010 | Wang et al. |
| 2010/0050083 A1 | 2/2010 | Axen et al. |
| 2010/0069159 A1 | 3/2010 | Yamada et al. |
| 2010/0077290 A1 | 3/2010 | Pueyo |
| 2010/0088726 A1 | 4/2010 | Curtis et al. |
| 2010/0122286 A1 | 5/2010 | Begeja et al. |
| 2010/0146145 A1 | 6/2010 | Tippin et al. |
| 2010/0153512 A1 | 6/2010 | Balassanian et al. |
| 2010/0153885 A1 | 6/2010 | Yates |
| 2010/0161792 A1 | 6/2010 | Palm et al. |
| 2010/0162344 A1 | 6/2010 | Casagrande et al. |
| 2010/0167816 A1 | 7/2010 | Perlman et al. |
| 2010/0167819 A1 | 7/2010 | Schell |
| 2010/0186032 A1 | 7/2010 | Pradeep et al. |
| 2010/0186579 A1 | 7/2010 | Schnitman |
| 2010/0210351 A1 | 8/2010 | Berman |
| 2010/0251295 A1 | 9/2010 | Amento et al. |
| 2010/0262336 A1 | 10/2010 | Rivas et al. |
| 2010/0267450 A1 | 10/2010 | McMain |
| 2010/0268361 A1 | 10/2010 | Mantel et al. |
| 2010/0278509 A1 | 11/2010 | Nagano et al. |
| 2010/0287033 A1 | 11/2010 | Mathur |
| 2010/0287475 A1 | 11/2010 | van Zwol et al. |
| 2010/0293455 A1 | 11/2010 | Bloch |
| 2010/0325135 A1 | 12/2010 | Chen et al. |
| 2010/0332404 A1 | 12/2010 | Valin |
| 2011/0000797 A1 | 1/2011 | Henry |
| 2011/0007797 A1 | 1/2011 | Palmer et al. |
| 2011/0010742 A1 | 1/2011 | White |
| 2011/0026898 A1 | 2/2011 | Lussier et al. |
| 2011/0033167 A1 | 2/2011 | Arling et al. |
| 2011/0041059 A1 | 2/2011 | Amarasingham et al. |
| 2011/0069940 A1 | 3/2011 | Shimy et al. |
| 2011/0078023 A1 | 3/2011 | Aldrey et al. |
| 2011/0078740 A1 | 3/2011 | Bolyukh et al. |
| 2011/0096225 A1 | 4/2011 | Candelore |
| 2011/0126106 A1 | 5/2011 | Ben Shaul et al. |
| 2011/0131493 A1 | 6/2011 | Dahl |
| 2011/0138331 A1 | 6/2011 | Pugsley et al. |
| 2011/0163969 A1 | 7/2011 | Anzures et al. |
| 2011/0169603 A1 | 7/2011 | Fithian et al. |
| 2011/0191684 A1 | 8/2011 | Greenberg |
| 2011/0191801 A1 | 8/2011 | Vytheeswaran |
| 2011/0193982 A1 | 8/2011 | Kook et al. |
| 2011/0197131 A1 | 8/2011 | Duffin et al. |
| 2011/0200116 A1 | 8/2011 | Bloch et al. |
| 2011/0202562 A1 | 8/2011 | Bloch et al. |
| 2011/0238494 A1 | 9/2011 | Park |
| 2011/0239246 A1 | 9/2011 | Woodward et al. |
| 2011/0246885 A1 | 10/2011 | Pantos et al. |
| 2011/0252320 A1 | 10/2011 | Arrasvuori et al. |
| 2011/0264755 A1 | 10/2011 | Salvatore De Villiers |
| 2011/0282745 A1 | 11/2011 | Meoded et al. |
| 2011/0282906 A1 | 11/2011 | Wong |
| 2011/0307786 A1 | 12/2011 | Shuster |
| 2011/0307919 A1 | 12/2011 | Weerasinghe |
| 2011/0307920 A1 | 12/2011 | Blanchard et al. |
| 2011/0313859 A1 | 12/2011 | Stillwell et al. |
| 2011/0314030 A1 | 12/2011 | Burba et al. |
| 2012/0004960 A1 | 1/2012 | Ma et al. |
| 2012/0005287 A1 | 1/2012 | Gadel et al. |

(56) References Cited

U.S. PATENT DOCUMENTS

| | | |
|---|---|---|
| 2012/0017141 A1 | 1/2012 | Eelen et al. |
| 2012/0062576 A1 | 3/2012 | Rosenthal et al. |
| 2012/0081389 A1 | 4/2012 | Dilts |
| 2012/0089911 A1 | 4/2012 | Hosking et al. |
| 2012/0094768 A1 | 4/2012 | McCaddon et al. |
| 2012/0105723 A1 | 5/2012 | van Coppenolle et al. |
| 2012/0110618 A1 | 5/2012 | Kilar et al. |
| 2012/0110620 A1 | 5/2012 | Kilar et al. |
| 2012/0120114 A1 | 5/2012 | You et al. |
| 2012/0134646 A1 | 5/2012 | Alexander |
| 2012/0147954 A1 | 6/2012 | Kasai et al. |
| 2012/0159541 A1 | 6/2012 | Carton et al. |
| 2012/0179970 A1 | 7/2012 | Hayes |
| 2012/0198412 A1 | 8/2012 | Creighton et al. |
| 2012/0213495 A1 | 8/2012 | Hafeneger et al. |
| 2012/0225693 A1 | 9/2012 | Sirpal et al. |
| 2012/0263263 A1 | 10/2012 | Olsen et al. |
| 2012/0308206 A1 | 12/2012 | Kulas |
| 2012/0317198 A1 | 12/2012 | Patton et al. |
| 2012/0324491 A1 | 12/2012 | Bathiche et al. |
| 2013/0021269 A1 | 1/2013 | Johnson et al. |
| 2013/0028446 A1 | 1/2013 | Krzyzanowski |
| 2013/0028573 A1 | 1/2013 | Hoofien et al. |
| 2013/0031582 A1 | 1/2013 | Tinsman et al. |
| 2013/0039632 A1 | 2/2013 | Feinson |
| 2013/0046847 A1 | 2/2013 | Zavesky et al. |
| 2013/0054728 A1 | 2/2013 | Amir et al. |
| 2013/0055321 A1 | 2/2013 | Cline et al. |
| 2013/0061263 A1 | 3/2013 | Issa et al. |
| 2013/0097643 A1 | 4/2013 | Stone et al. |
| 2013/0117248 A1* | 5/2013 | Bhogal ............ H04N 21/41407 707/705 |
| 2013/0125181 A1 | 5/2013 | Montemayor et al. |
| 2013/0129304 A1 | 5/2013 | Feinson |
| 2013/0129308 A1 | 5/2013 | Karn et al. |
| 2013/0173765 A1 | 7/2013 | Korbecki |
| 2013/0177294 A1 | 7/2013 | Kennberg |
| 2013/0188923 A1 | 7/2013 | Hartley et al. |
| 2013/0202265 A1 | 8/2013 | Arrasvuori et al. |
| 2013/0204710 A1 | 8/2013 | Boland et al. |
| 2013/0219425 A1 | 8/2013 | Swartz |
| 2013/0235270 A1 | 9/2013 | Sasaki et al. |
| 2013/0254292 A1 | 9/2013 | Bradley |
| 2013/0259442 A1 | 10/2013 | Bloch et al. |
| 2013/0282917 A1 | 10/2013 | Reznik et al. |
| 2013/0290818 A1 | 10/2013 | Arrasvuori et al. |
| 2013/0298146 A1 | 11/2013 | Conrad et al. |
| 2013/0308926 A1 | 11/2013 | Jang et al. |
| 2013/0328888 A1 | 12/2013 | Beaver et al. |
| 2013/0330055 A1 | 12/2013 | Zimmermann et al. |
| 2013/0335427 A1 | 12/2013 | Cheung et al. |
| 2014/0015940 A1 | 1/2014 | Yoshida |
| 2014/0019865 A1 | 1/2014 | Shah |
| 2014/0025839 A1 | 1/2014 | Marko et al. |
| 2014/0040273 A1 | 2/2014 | Cooper et al. |
| 2014/0040280 A1 | 2/2014 | Slaney et al. |
| 2014/0078397 A1 | 3/2014 | Bloch et al. |
| 2014/0082666 A1 | 3/2014 | Bloch et al. |
| 2014/0085196 A1 | 3/2014 | Zucker et al. |
| 2014/0086445 A1 | 3/2014 | Brubeck et al. |
| 2014/0094313 A1 | 4/2014 | Watson et al. |
| 2014/0101550 A1 | 4/2014 | Zises |
| 2014/0126877 A1 | 5/2014 | Crawford et al. |
| 2014/0129618 A1 | 5/2014 | Panje et al. |
| 2014/0136186 A1 | 5/2014 | Adami et al. |
| 2014/0152564 A1 | 6/2014 | Guiezian et al. |
| 2014/0156677 A1 | 6/2014 | Collins, III et al. |
| 2014/0178051 A1 | 6/2014 | Bloch et al. |
| 2014/0186008 A1 | 7/2014 | Eyer |
| 2014/0194211 A1 | 7/2014 | Chimes et al. |
| 2014/0210860 A1 | 7/2014 | Caissy |
| 2014/0219630 A1 | 8/2014 | Minder |
| 2014/0220535 A1 | 8/2014 | Angelone |
| 2014/0237520 A1 | 8/2014 | Rothschild et al. |
| 2014/0245152 A1 | 8/2014 | Carter et al. |
| 2014/0270680 A1 | 9/2014 | Bloch et al. |
| 2014/0279032 A1 | 9/2014 | Roever et al. |
| 2014/0282013 A1 | 9/2014 | Amijee |
| 2014/0282642 A1* | 9/2014 | Needham ......... H04N 21/44218 725/10 |
| 2014/0298173 A1 | 10/2014 | Rock |
| 2014/0314239 A1 | 10/2014 | Meyer et al. |
| 2014/0380167 A1 | 12/2014 | Bloch et al. |
| 2015/0007234 A1 | 1/2015 | Rasanen et al. |
| 2015/0012369 A1 | 1/2015 | Dharmaji et al. |
| 2015/0046946 A1 | 2/2015 | Hassell et al. |
| 2015/0058342 A1 | 2/2015 | Kim et al. |
| 2015/0063781 A1 | 3/2015 | Silverman et al. |
| 2015/0067596 A1 | 3/2015 | Brown et al. |
| 2015/0067723 A1 | 3/2015 | Bloch et al. |
| 2015/0070458 A1 | 3/2015 | Kim et al. |
| 2015/0104155 A1 | 4/2015 | Bloch et al. |
| 2015/0124171 A1 | 5/2015 | King |
| 2015/0154439 A1* | 6/2015 | Anzue ..................... G06F 3/012 348/77 |
| 2015/0160853 A1 | 6/2015 | Hwang et al. |
| 2015/0179224 A1 | 6/2015 | Bloch et al. |
| 2015/0181271 A1 | 6/2015 | Onno et al. |
| 2015/0181301 A1 | 6/2015 | Bloch et al. |
| 2015/0185965 A1 | 7/2015 | Belliveau et al. |
| 2015/0195601 A1 | 7/2015 | Hahm |
| 2015/0199116 A1 | 7/2015 | Bloch et al. |
| 2015/0201187 A1 | 7/2015 | Ryo |
| 2015/0256861 A1 | 9/2015 | Oyman |
| 2015/0258454 A1 | 9/2015 | King et al. |
| 2015/0293675 A1 | 10/2015 | Bloch et al. |
| 2015/0294685 A1 | 10/2015 | Bloch et al. |
| 2015/0304698 A1 | 10/2015 | Redol |
| 2015/0318018 A1 | 11/2015 | Kaiser et al. |
| 2015/0331485 A1* | 11/2015 | Wilairat ............ G02B 27/0093 345/156 |
| 2015/0331933 A1 | 11/2015 | Tocchini, IV et al. |
| 2015/0331942 A1 | 11/2015 | Tan |
| 2015/0348325 A1 | 12/2015 | Voss |
| 2016/0021412 A1 | 1/2016 | Zito, Jr. |
| 2016/0037217 A1 | 2/2016 | Harmon et al. |
| 2016/0057497 A1 | 2/2016 | Kim et al. |
| 2016/0062540 A1 | 3/2016 | Yang et al. |
| 2016/0065831 A1 | 3/2016 | Howard et al. |
| 2016/0066051 A1 | 3/2016 | Caidar et al. |
| 2016/0094875 A1 | 3/2016 | Peterson et al. |
| 2016/0100226 A1 | 4/2016 | Sadler et al. |
| 2016/0104513 A1 | 4/2016 | Bloch et al. |
| 2016/0105724 A1 | 4/2016 | Bloch et al. |
| 2016/0132203 A1 | 5/2016 | Seto et al. |
| 2016/0142889 A1 | 5/2016 | O'Connor et al. |
| 2016/0162179 A1 | 6/2016 | Annett et al. |
| 2016/0170948 A1 | 6/2016 | Bloch |
| 2016/0173944 A1 | 6/2016 | Kilar et al. |
| 2016/0217829 A1 | 7/2016 | Bloch et al. |
| 2016/0224573 A1 | 8/2016 | Shahraray et al. |
| 2016/0277779 A1* | 9/2016 | Zhang ............ H04N 21/234381 |
| 2016/0303608 A1 | 10/2016 | Jossick |
| 2016/0322054 A1 | 11/2016 | Bloch et al. |
| 2016/0323608 A1 | 11/2016 | Bloch et al. |
| 2016/0365117 A1 | 12/2016 | Boliek et al. |
| 2016/0366454 A1 | 12/2016 | Tatourian et al. |
| 2017/0006322 A1 | 1/2017 | Dury et al. |
| 2017/0062012 A1 | 3/2017 | Bloch et al. |
| 2017/0178409 A1 | 6/2017 | Bloch et al. |
| 2017/0178601 A1 | 6/2017 | Bloch et al. |
| 2017/0195736 A1 | 7/2017 | Chai et al. |
| 2017/0264920 A1 | 9/2017 | Mickelsen |
| 2017/0289220 A1 | 10/2017 | Bloch et al. |
| 2017/0295410 A1 | 10/2017 | Bloch et al. |
| 2017/0345460 A1 | 11/2017 | Bloch et al. |
| 2018/0007443 A1 | 1/2018 | Cannistraro et al. |
| 2018/0014049 A1 | 1/2018 | Griffin et al. |
| 2018/0025078 A1 | 1/2018 | Quennesson |
| 2018/0068019 A1 | 3/2018 | Novikoff et al. |
| 2018/0130501 A1 | 5/2018 | Bloch et al. |
| 2018/0176573 A1 | 6/2018 | Chawla et al. |
| 2018/0191574 A1 | 7/2018 | Vishnia et al. |
| 2018/0254067 A1 | 9/2018 | Elder |

(56) References Cited

U.S. PATENT DOCUMENTS

| | | | |
|---|---|---|---|
| 2018/0262798 | A1 | 9/2018 | Ramachandra |
| 2019/0075367 | A1 | 3/2019 | van Zessen et al. |
| 2019/0090002 | A1 | 3/2019 | Ramadorai et al. |
| 2019/0166412 | A1 | 5/2019 | Panchaksharaiah et al. |
| 2019/0335225 | A1 | 10/2019 | Fang et al. |

FOREIGN PATENT DOCUMENTS

| | | | |
|---|---|---|---|
| DE | 10053720 | A1 | 4/2002 |
| EP | 0965371 | A2 | 12/1999 |
| EP | 1033157 | A2 | 9/2000 |
| EP | 0965371 | A3 | 3/2001 |
| EP | 1033157 | A3 | 11/2001 |
| EP | 2104105 | A1 | 9/2009 |
| GB | 2359916 | A | 9/2001 |
| GB | 2428329 | A | 1/2007 |
| JP | 2008005288 | A | 1/2008 |
| KR | 2004-0005068 | A | 1/2004 |
| KR | 2010-0037413 | A | 4/2010 |
| WO | 1996/013810 | A1 | 5/1996 |
| WO | WO-1996/013810 | A1 | 5/1996 |
| WO | WO-2000/059224 | A1 | 10/2000 |
| WO | WO-2007/062223 | A2 | 5/2007 |
| WO | WO-2007/138546 | A2 | 12/2007 |
| WO | WO-2008/001350 | A2 | 1/2008 |
| WO | WO-2008/057444 | A2 | 5/2008 |
| WO | WO-2008052009 | A2 | 5/2008 |
| WO | WO-2008/057444 | A3 | 7/2008 |
| WO | WO-2008/001350 | A3 | 10/2008 |
| WO | WO-2008/052009 | A3 | 10/2008 |
| WO | WO-2007/138546 | A3 | 4/2009 |
| WO | WO-2009/137919 | A1 | 11/2009 |
| WO | WO-2009125404 | A3 | 1/2010 |

OTHER PUBLICATIONS

Archos Gen 5 English User Manual Version 3.0, Jul. 26, 2007, pp. 1-81.
Barlett, Mitch, "iTunes 11: How to Queue Next Song," Technipages, Oct. 6, 2008, pp. 1-8, retrieved on Dec. 26, 2013 from the internet http://www.technipages.com/itunes-queue-next-song.html.
Gregor Miller et al. "MiniDiver: A Novel Mobile Media Playback Interface for Rich Video Content on an iPhoneTM", Entertainment Computing A ICEC 2009, Sep. 3, 2009, pp. 98-109.
International Search Report for International Patent Application PCT/IL2010/000362 dated Aug. 25, 2010 (2 pages).
International Search Report for International Patent Application PCT/IL2012/000080 dated Aug. 9, 2012 (4 pages).
International Search Report for International Patent Application PCT/IL2012/000081 dated Jun. 28, 2012 (4 pages).
International Search Report and Written Opinion for International Patent Application PCT/IB2013/001000 dated Jul. 31, 2013 (12 pages).
Labs.byHook: "Ogg Vorbis Encoder for Flash: Alchemy Series Part 1," [Online] Internet Article, Retrieved on Jun. 14, 2012 from the Internet: URL:http://labs.byhook.com/2011/02/15/ogg-vorbis-encoder-for-flash-alchemy-series-part-1/, 2011, (pp. 1-8).
Sodagar, I., (2011) "The MPEG-DASH Standard for Multimedia Streaming Over the Internet", IEEE Multimedia, IEEE Service Center, New York, NY US, vol. 18, No. 4, pp. 62-67.
Supplemental European Search Report for EP10774637.2 (PCT/IL2010/000362) dated Jun. 20, 2012 (6 pages).
Supplemental European Search Report for EP13184145 dated Jan. 30, 2014 (6 pages).
Yang, H, et al., "Time Stamp Synchronization in Video Systems," Teletronics Technology Corporation, <http://www.ttcdas.com/products/daus_encoders/pdf/_tech_papers/tp_2010_time_stamp_video_system.pdf>, Abstract, (8 pages).
U.S. Appl. No. 14/884,285 Published as US2016/0170948, System and Method for Assembling a Recorded Composition, filed Oct. 15, 2015.
U.S. Appl. No. 14/639,579 Published as US2015/0199116, Progress Bar for Branched Videos, filed Mar. 5, 2015.
U.S. Appl. No. 14/984,821 Published as US2016/0217829, System and Method for Synchronization of Selectably Presentable Media Streams, filed Dec. 30, 2015.
U.S. Appl. No. 14/107,600 Published as US2015/0067723, Methods and Systems for Unfolding Video Pre-Roll, filed Dec. 16, 2013.
U.S. Appl. No. 15/703,462 Published as US20180130501, Systems and Methods for Dynamic Video Bookmarking, filed Sep. 13, 2017.
U.S. Appl. No. 14/700,845 Published as US2016/0323608, Systems and Methods for Nonlinear Video Playback Using Linear Real-Time Video Players, filed Apr. 30, 2015.
U.S. Appl. No. 14/835,857 Published as US2017/0062012, Systems and Methods for Adaptive and Responsive Video, filed Aug. 26, 2015.
U.S. Appl. No. 15/085,209 Published as US-2017/0289220, Media Stream Rate Synchronization, filed Mar. 30, 2016.
U.S. Appl. No. 15/189,931 U.S. Pat. No. 10,218,760 Published as US 2017-0374120, Dynamic Summary Generation for Real-time Switchable Video, filed Jun. 22, 2016.
U.S. Appl. No. 15/997,284, Interactive Video Dynamic Adaption and User Profiling, filed Jun. 4, 2018.
U.S. Appl. No. 15/863,191 U.S. Pat. No. 10,257,578, Dynamic Library Display for Interactive Videos, filed Mar. 5, 2018.
U.S. Appl. No. 16/283,066, Dynamic Library Display for Interactive Videos, filed Feb. 22, 2018.
U.S. Appl. No. 12/706,721, now U.S. Pat. No. 9,190,110, the Office Actions dated Apr. 26, 2012, Aug. 17, 2012, Mar. 28, 2013, Jun. 20, 2013, Jan. 3, 2014, Jul. 7, 2014, and Dec. 19, 2014; the Notices of Allowance dated Jun. 19, 2015 and Jul. 17, 2015; the Notices of Allowance dated Jul. 29, 2015, Aug. 12, 2015 and Sep. 14, 2015.
U.S. Appl. No. 13/034,645, the Office Actions dated Jul. 23, 2012, Mar. 21, 2013, Sep. 15, 2014, Jun. 4, 2015, Apr. 7, 2017, Oct. 6, 2017, Aug. 10, 2018 and Apr. 5, 2019.
U.S. Appl. No. 14/884,285, the Office Actions dated Oct. 5, 2017 and Jul. 26, 2018.
U.S. Appl. No. 14/639,579, the Office Actions dated May 3, 2017, Nov. 22, 2017 and Jun. 26, 2018, the Notice of Allowance dated Feb. 8, 2019.
U.S. Appl. No. 13/838,830, now U.S. Pat. No. 9,257,148, the Office Action dated May 7, 2015, the Notice of Allowance dated Oct. 7, 2015 and Nov. 6, 2015.
U.S. Appl. No. 14/984,821, the Office Actions dated Jun. 1, 2017, Dec. 6, 2017, and Oct. 5, 2018.
U.S. Appl. No. 13/921,536, now U.S. Pat. No. 9,832,516, the Office Actions dated Feb. 25, 2015, Oct. 20, 2015, Aug. 26, 2016 and Mar. 8, 2017, the Advisory Action dated Jun. 21, 17, and Notice of Allowance dated Sep. 12, 2017.
U.S. Appl. No. 14/107,600, the Office Actions dated Dec. 19, 2014, Jul. 8, 2015, Jun. 3, 2016, Mar. 8, 2017, Oct. 10, 2017 and Jul. 25, 2018, and Notice of Allowance dated Dec. 31, 2018.
U.S. Appl. No. 15/481,916, the Office Actions dated Aug. 6, 2018, Oct. 6, 2017 and Mar. 8, 2019.
U.S. Appl. No. 14/249,665, now U.S. Pat. No. 9,792,026, the Office Actions dated May 16, 2016 and Feb. 22, 2017; and the Notice of Allowance dated Jun. 2, 2017.
U.S. Appl. No. 15/703,462.
U.S. Appl. No. 14/534,626, the Office Actions dated Nov. 25, 2015, Jul. 5, 2016, Jun. 5, 2017, Mar. 2, 2018 and Sep. 26, 2018.
U.S. Appl. No. 14/700,845, the Office Actions dated May 20, 2016, Dec. 2, 2016, May 22, 2017, Nov. 28, 2017, Jun. 27, 2018 and Feb. 19, 2019.
U.S. Appl. No. 14/835,857, the Office Actions dated Sep. 23, 2016, Jun. 5, 2017, Aug. 9, 2018; the Advisory Action dated Oct. 20, 2017; and Notice of Allowance dated Feb. 25, 2019.
U.S. Appl. No. 14/978,491, the Office Actions dated Sep. 8, 2017, May 25, 2018 and Dec. 14, 2018.
U.S. Appl. No. 15/085,209, the Office Actions dated Feb. 26, 2018 and Dec. 31, 2018.
U.S. Appl. No. 15/165,373, the Office Actions dated Mar. 24, 2017, Oct. 11, 2017, May 18, 2018 and Feb. 1, 2019.
U.S. Appl. No. 15/189,931, the Office Actions dated Apr. 6, 2018, Notice of Allowance dated Oct. 24, 2018.

(56) References Cited

OTHER PUBLICATIONS

U.S. Appl. No. 15/395,477, the Office Actions dated Nov. 2, 2018.
U.S. Appl. No. 15/997,284.
U.S. Appl. No. 15/863,191, Notice ot Allowances dated Jul. 5, 2018 and Nov. 23, 2018.
U.S. Appl. No. 16/283,066.
U.S. Appl. No. 13/034,645 Published as US2011/0202562, System and Method for Data Mining Within Interactive Multimedia, filed Feb. 24, 2011.
U.S. Appl. No. 14/249,627 U.S. Appl. No. 9,653,115 Published as US 2015-0294685, Systems and Methods for Creating Linear Video From Branched Video, filed Apr. 10, 2014.
U.S. Appl. No. 15/481,916 Published as US 2017-0345460, Systems and Methods for Creating Linear Video From Branched Video, filed Apr. 7, 2017.
U.S. Appl. No. 14/534,626 Published as US-2018-0130501-A1, Systems and Methods for Dynamic Video Bookmarking, filed Sep. 13, 2017.
U.S. Appl. No. 16/752,193, Systems and Methods for Nonlinear Video Playback Using Linear Real-Time Video Players, filed Jan. 24, 2020.
U.S. Appl. No. 16/559,082 Published as US2019/0392868, Systems and Methods for Adaptive and Responsive Video, filed Sep. 3, 2019.
U.S. Appl. No. 15/997,284, Interactive Video Dynamic Adaptation and User Profiling, filed Jun. 4, 2018.
U.S. Appl. No. 16/283,066, Dynamic Library Display for Interactive Videos, filed Feb. 22, 2019.
U.S. Appl. No. 16/793,205, Dynamic Adaption of Interactive Video Players Using Behavioral Analytics, filed Feb. 18, 2020.
U.S. Appl. No. 16/793,201, System and Methods For Detecting Anomalous Activities For Interactive Videos, filed Feb. 18, 2020.
U.S. Appl. No. 14/884,284, the Office Actions dated Sep. 8, 2017; May 18, 2018; Dec. 14, 2018; Jul. 25, 2019; and Nov. 18, 2019.
U.S. Appl. No. 13/034,645, the Office Actions dated Jul. 23, 2012, Mar. 21, 2013, Sep. 15, 2014, Jun. 4, 2015, Apr. 7, 2017, Oct. 6, 2017, Aug. 10, 2018, Jul. 5, 2016, Apr. 5, 2019 and Dec. 26, 2019.
U.S. Appl. No. 14/639,579, the Office Actions dated May 3, 2017, Nov. 22, 2017 and Jun. 26, 2018, the Notice of Allowance dated Feb. 8, 2019 and Jul. 11, 2019.
U.S. Appl. No. 14/107,600, now U.S. Pat. No. 10,448,119, the Office Actions dated Dec. 19, 2014, Jul. 8, 2015, Jun. 3, 2016, Mar. 8, 2017, Oct. 10, 2017 and Jul. 25, 2018, Notices of Allowance dated Dec. 31, 2018 and Apr. 25, 2019.
U.S. Appl. No. 15/481,916, the Office Actions dated Oct. 6, 2017, Aug. 6, 2018, Mar. 8, 2019 and Nov. 27, 2019.
U.S. Appl. No. 15/703,462, the Office Action dated Jun. 21, 2019, and Dec. 27, 2019.
U.S. Appl. No. 14/534,626, the Office Actions dated Nov. 25, 2015, Jul. 5, 2016, Jun. 5, 2017, Mar. 2, 2018, Sep. 26, 2018, May 8, 2019 and Dec. 27, 2019.
U.S. Appl. No. 14/700,845, the Office Actions dated May 20, 2016, Dec. 2, 2016, May 22, 2017, Nov. 28, 2017, Jun. 27, 2018 and Feb. 19, 2019 and the Notice of Allowance dated Oct. 21, 2019.
U.S. Appl. No. 14/835,857, now U.S. Pat. No. 10,460,765, the Office Actions dated Sep. 23, 2016, Jun. 5, 2017 and Aug. 9, 2018, and the Advisory Action dated Oct. 20, 2017; Notice of Allowances dated Feb. 25, 2019 and Jun. 7, 2019.
U.S. Appl. No. 16/559,082, the Office Actions dated Feb. 20, 2020.
U.S. Appl. No. 14/978,491, the Office Actions dated Sep. 8, 2017; May 25, 2018, Dec. 14, 2018, Aug. 12, 2019 and Dec. 23, 2019.
U.S. Appl. No. 15/165,373, the Office Actions dated Mar. 24, 2017, Oct. 11, 2017, May 18, 2018; Feb. 1, 2019, Aug. 8, 2019, and Jan. 3, 2020.
U.S. Appl. No. 15/395,477, the Office Actions dated Nov. 2, 2018, and Aug. 16, 2019.
U.S. Appl. No. 15/997,284, the Office Actions dated Aug. 11, 2019 and Nov. 21, 2019.
U.S. Appl. No. 10/257,578, now U.S. Appl. No. 10/257,578, Notices of Allowance dated Jul. 5, 2018 and Nov. 23, 2018.
U.S. Appl. No. 16/283,066, the Office Action dated Jan. 6, 2020.
U.S. Appl. No. 12/706,721 U.S. Pat. No. 9,190,110 Published as US2010/0293455, System and Method for Assembling a Recorded Composition, filed Feb. 17, 2010.
U.S. Appl. No. 14/884,285 Published as US2017/0178601, Systems and Method for Assembling a Recorded Composition, filed Oct. 15, 2015.
U.S. Appl. No. 13/033,916 U.S. Pat. No. 9,607,655 Published as US2011/0200116, System and Method for Seamless Multimedia Assembly, filed Feb. 24, 2011.
U.S. Appl. No. 13/034,645.
U.S. Appl. No. 13/437,164 U.S. Pat. No. 8,600,220 Published as US2013/0259442, Systems and Methods for Loading More Than One Video Content at a Time, filed Apr. 2, 2012.
U.S. Appl. No. 14/069,694 U.S. Pat. No. 9,271,015 Published as US2014/0178051, Systems and Methods for Loading More Than One Video Content at a Time, filed Nov. 1, 2013.
U.S. Appl. No. 13/622,780 U.S. Pat. No. 8,860,882 Published as US2014/0078397, Systems and Methods for Constructing Multimedia Content Modules, filed Sep. 19, 2012.
U.S. Appl. No. 13/622,795 U.S. Pat. No. 9,009,619 Published as US2014/0082666, Progress Bar for Branched Videos, filed Sep. 19, 2012.
U.S. Appl. No. 14/639,579 U.S. Pat. No. 10,474,334 Published as US2015/0199116, Progress Bar for Branched Videos, filed Mar. 5, 2015.
U.S. Appl. No. 13/838,830 U.S. Pat. No. 9,257,148 Published as US2014/0270680, System and Method for Synchronization of Selectably Presentable Media Streams, filed Mar. 15, 2013.
U.S. Appl. No. 14/984,821 U.S. Pat. No. 10,418,066 Published as US2016/0217829, System and Method for Synchronization of Selectably Presentable Media Streams, filed Dec. 30, 2015.
U.S. Appl. No. 13/921,536 U.S. Pat. No. 9,832,516 Published as US2014/0380167, Systems and Methods for Multiple Device Interaction with Selectably Presentable Media Streams, filed Jun. 19, 2013.
U.S. Appl. No. 14/107,600 U.S. Pat. No. 10,448,119 Published as US2015/0067723, Methods and Systems for Unfolding Video Pre-Roll, filed Dec. 16, 2013.
U.S. Appl. No. 14/335,381 U.S. Pat. No. 9,530,454 Published as US2015/0104155, Systems and Methods for Real-Time Pixel Switching, filed Jul. 18, 2014.
U.S. Appl. No. 15/356,913, Systems and Methods for Real-Time Pixel Switching, filed Nov. 21, 2016.
U.S. Appl. No. 14/139,996 U.S. Pat. No. 9,641,898 Published as US2015/0181301, Methods and Systems for In-Video Library, filed Dec. 24, 2013.
U.S. Appl. No. 14/140,007 U.S. Pat. No. 9,520,155 Published as US2015/0179224, Methods and Systems For Seeking To Non-Key Frames, filed Dec. 24, 2013.
U.S. Appl. No. 14/249,627 U.S. Pat. No. 9,653,115 Published as US 2015-0294685, Systems and Methods for Creating Linear Video From Branched Video, filed Apr. 10, 2014.
U.S. Appl. No. 15/481,916 U.S. Pat. No. 10,755,747 Published as US 2017-0345460, Systems and Methods for Creating Linear Video From Branched Video, filed Apr. 7, 2017.
U.S. Appl. No. 16/986,977 Published as US 20200365187, Systems and Methods for Creating Linear Video From Branched Video, filed Aug. 6, 2020.
U.S. Appl. No. 14/249,665 U.S. Pat. No. 9,792,026 Published as US2015/0293675, Dynamic Timeline For Branched Video, filed Apr. 10, 2014.
U.S. Appl. No. 14/509,700 U.S. Pat. No. 9,792,957 Published as US2016/0104513, Systems and Methods for Dynamic Video Bookmarking, filed Oct. 8, 2014.
U.S. Appl. No. 14/534,626 U.S. Pat. No. 10,692,540 Published as US-2018-0130501-A1, Systems and Methods for Dynamic Video Bookmarking, filed Sep. 13, 2017.
U.S. Appl. No. 16/865,896 U.S. Pat. No. 10,885,944 Published as US 2020-0265870 A1, Systems and Methods for Dynamic Video Bookmarking, filed May 4, 2020.
U.S. Appl. No. 17/138,434, Systems and Methods for Dynamic Video Bookmarking, filed Dec. 30, 2020.

(56) References Cited

OTHER PUBLICATIONS

U.S. Appl. No. 14/534,626 Published as US2016/0105724, Systems and Methods for Parallel Track Transitions, filed Nov. 6, 2014.
U.S. Appl. No. 14/700,845 U.S. Pat. No. 10,582,265 Published as US2016/0323608, Systems and Methods for Nonlinear Video Playback Using Linear Real-Time Video Players, filed Apr. 30, 2015.
U.S. Appl. No. 16/752,193 Published as US2020/0404382, Systems and Methods for Nonlinear Video Playback Using Linear Real-Time Video Players, filed Jan. 24, 2020.
U.S. Appl. No. 14/700,862 U.S. Pat. No. 9,672,868 Published as US2016/0322054, Systems and Methods for Seamless Media Creation, filed Apr. 30, 2015.
U.S. Appl. No. 14/835,857 U.S. Pat. No. 10,460,765 Published as US2017/0062012, Systems and Methods for Adaptive and Responsive Video, filed Aug. 26, 2015.
U.S. Appl. No. 16/559,082, Systems and Methods for Adaptive and Responsive Video, filed Sep. 3, 2019.
U.S. Appl. No. 16/800,994, Systems and Methods for Adaptive and Responsive Video, filed Feb. 25, 2020.
U.S. Appl. No. 14/978,491 Published as US2017/0178409, Seamless Transitions In Large-Scale Video, filed Dec. 22, 2015.
U.S. Appl. No. 15/085,209 U.S. Pat. No. 10,462,202 Published as US2017/0289220, Media Stream Rate Synchronization, filed Mar. 30, 2016.
U.S. Appl. No. 15/165,373 Published as US 2017-0295410, Symbiotic Interactive Video, filed May 26, 2016.
U.S. Appl. No. 15/189,931 U.S. Pat. No. 10,218,760 Published as US2017/0374120, Dynamic Summary Generation for Real-time Switchable Videos, filed Jun. 22, 2016.
U.S. Appl. No. 15/395,477 Published as US2018/0191574, Systems and Methods for Dynamic Weighting of Branched Video Paths, filed Dec. 30, 2016.
U.S. Appl. No. 15/997,284 Published as US2019/0373330, Interactive Video Dynamic Adaptation and User Profiling, filed Jun. 4, 2018.
U.S. Appl. No. 15/863,191 U.S. Pat. No. 10,257,578, Dynamic Library Display for Interactive Videos, filed Jan. 5, 2018.
U.S. Appl. No. 16/283,066 U.S. Pat. No. 10,856,049 Published as US2019/0349637, Dynamic Library Display for Interactive Videos, filed Feb. 22, 2019.
U.S. Appl. No. 17/091,149, Dynamic Library Display for Interactive Videos, filed Nov. 6, 2020.
U.S. Appl. No. 16/591,103, Systems and Methods for Dynamically Adjusting Video Aspect Ratios, filed Oct. 2, 2019.
U.S. Appl. No. 16/793,205, Dynamic Adaptation of Interactive Video Players Using Behavioral Analytics, filed Feb. 18, 2020.
U.S. Appl. No. 16/793,201, Systems and Methods for Detecting Anomalous Activities for Interactive Videos, filed Feb. 18, 2020.
U.S. Appl. No. 16/922,540, Systems and Methods for Seamless Audio and Video Endpoint Transitions, filed Jul. 7, 2020.
U.S. Appl. No. 12/706,721, now U.S. Pat. No. 9,190,110, the Office Actions dated Apr. 26, 2012, Aug. 17, 2012, Mar. 28, 2013, Jun. 20, 2013, Jan. 3, 2014, Jul. 7, 2014, and Dec. 19, 2014; the Notices of Allowance dated Jun. 19, 2015, Jul. 17, 2015, Jul. 29, 2015, Aug. 12, 2015, and Sep. 14, 2015.
U.S. Appl. No. 14/884,284, the Office Actions dated Sep. 8, 2017; May 18, 2018; Dec. 14, 2018; Jul. 25, 2019; Nov. 18, 2019 and Feb. 21, 2020.
U.S. Appl. No. 13/033,916, now U.S. Pat. No. 9,607,655, the Office Actions dated Jun. 7, 2013, Jan. 2, 2014, Aug. 28, 2014, Jan. 5, 2015, Jul. 9, 2015, and Jan. 5, 2016; the Advisory Action dated May 11, 2016; and the Notice of Allowance dated Dec. 21, 2016.
U.S. Appl. No. 13/437,164, now U.S. Pat. No. 8,600,220, the Notice of Allowance dated Aug. 9, 2013.
U.S. Appl. No. 14/069,694, now U.S. Pat. No. 9,271,015, the Office Actions dated Apr. 27, 2015 and Aug. 31, 2015, the Notice of Allowance dated Oct. 13, 2015.
U.S. Appl. No. 13/622,780, now U.S. Pat. No. 8,860,882, the Office Action dated Jan. 16, 2014, the Notice of Allowance dated Aug. 4, 2014.

U.S. Appl. No. 13/622,795, now U.S. Pat. No. 9,009,619, the Office Actions dated May 23, 2014 and Dec. 1, 2014, the Notice of Allowance dated Jan. 9, 2015.
U.S. Appl. No. 14/639,579, now U.S. Pat. No. 10,474,334, the Office Actions dated May 3, 2017, Nov. 22, 2017 and Jun. 26, 2018, the Notices of Allowance dated Feb. 8, 2019 and Jul. 11, 2019.
U.S. Appl. No. 13/838,830, now U.S. Pat. No. 9,257,148, the Office Action dated May 7, 2015, Notices of Allowance dated Nov. 6, 2015.
U.S. Appl. No. 14/984,821, now U.S. Patent No. 10,418,066, the Office Actions dated Jun. 1, 2017, Dec. 6, 2017, and Oct. 5, 2018; the Notice of Allowance dated May 7, 2019.
U.S. Appl. No. 13/921,536, now U.S. Pat. No. 9,832,516, the Office Actions dated Feb. 25, 2015, Oct. 20, 2015, Aug. 26, 2016 and Mar. 8, 2017, the Advisory Action dated Jun. 21, 2017, and Notice of Allowance dated Sep. 12, 2017.
U.S. Appl. No. 14/107,600, now U.S. Pat. No. 10,448,119, the Office Actions dated Dec. 19, 2014, Jul. 8, 2015, Jun. 3, 2016, Mar. 8, 2017, Oct. 10, 2017 and Jul. 25, 2018, and the Notices of Allowance dated Dec. 31, 2018 and Apr. 25, 2019.
U.S. Appl. No. 14/335,381, now U.S. Pat. No. 9,530,454, the Office Action dated Feb. 12, 2016; and the Notice of Allowance dated Aug. 24, 2016.
U.S. Appl. No. 14/139,996, now U.S. Pat. No. 9,641,898, the Office Actions dated Jun. 18, 2015, Feb. 3, 2016 and May 4, 2016; and the Notice of Allowance dated Dec. 23, 2016.
U.S. Appl. No. 14/140,007, now U.S. Pat. No. 9,520,155, the Office Actions dated Sep. 8, 2015 and Apr. 26, 2016; and the Notice of Allowance dated Oct. 11, 2016.
U.S. Appl. No. 14/249,627, now U.S. Pat. No. 9,653,115, the Office Actions dated Jan. 14, 2016 and Aug. 9, 2016; and the Notice of Allowance dated Jan. 13, 2017.
U.S. Appl. No. 15/481,916, the Office Actions dated Oct. 6, 2017, Aug. 6, 2018, Mar. 8, 2019, Nov. 27, 2019, and the Notice of Allowance dated Apr. 21, 2020.
U.S. Appl. No. 14/249,665, now U.S. Pat. No. 9,792,026, the Office Actions dated May 16, 2016 and Feb. 22, 2017; and the Notices of Allowance dated Jun. 2, 2017 and Jul. 24, 2017.
U.S. Appl. No. 14/509,700, now U.S. Pat. No. 9,792,957, the Office Action dated Oct. 28, 2016; and the Notice of Allowance dated Jun. 15, 2017.
U.S. Appl. No. 15/703,462, the Office Action dated Jun. 21, 2019, and Dec. 27, 2019; and the Notice of Allowance dated Feb. 10, 2020.
U.S. Appl. No. 16/865,896, Notice of Allowance dated Sep. 3, 2020.
U.S. Appl. No. 14/534,626, the Office Actions dated Nov. 25, 2015, Jul. 5, 2016, Jun. 5, 2017, Mar. 2, 2018, Sep. 26, 2018, May 8, 2019, Dec. 27, 2019; and Aug. 19, 2020.
U.S. Appl. No. 14/700,845, now U.S. Pat. No. 9,653,115, the Office Actions dated May 20, 2016, Dec. 2, 2016, May 22, 2017, Nov. 28, 2017, Jun. 27, 2018 and Feb. 19, 2019 and the Notice of Allowance dated Oct. 21, 2019.
U.S. Appl. No. 14/700,862, now U.S. Pat. No. 9,672,868, the Office Action dated Aug. 26, 2016; and the Notice of Allowance dated Mar. 9, 2017.
U.S. Appl. No. 14/835,857, now U.S. Pat. No. 10,460,765, the Office Actions dated Sep. 23, 2016, Jun. 5, 2017 and Aug. 9, 2018, and the Advisory Action dated Oct. 20, 2017; Notices of Allowance dated Feb. 25, 2019 and Jun. 7, 2019.
U.S. Appl. No. 16/559,082, the Office Actions dated Feb. 21, 2020 and Jul. 23, 2020.
U.S. Appl. No. 16/800,994, the Office Action dated Apr. 15, 2020.
U.S. Appl. No. 14/978,464, the Office Actions dated Jul. 25, 2019, Dec. 14, 2018, May 18, 2018, Sep. 8, 2017, Dec. 14, 2018, Jul. 25, 2019, Nov. 18, 2019, Jul. 23, 2020.
U.S. Appl. No. 14/978,491, the Office Actions dated Sep. 8, 2017, May 25, 2018, Dec. 14, 2018, Aug. 12, 2019; Dec. 23, 2019; and Jul. 23, 2020.
U.S. Appl. No. 15/085,209, now U.S. Pat. No. 10,462,202, the Office Actions dated Feb. 26, 2018 and Dec. 31, 2018; the Notice of Allowance dated Aug. 12, 2019.

(56) References Cited

OTHER PUBLICATIONS

U.S. Appl. No. 15/165,373, the Office Actions dated Mar. 24, 2017, Oct. 11, 2017, May 18, 2018; Feb. 1, 2019, Aug. 8, 2019, Jan. 3, 2020 and Jan. 7, 2021.
U.S. Appl. No. 15/189,931, now U.S. Pat. No. 10,218,760, the Office Actions dated Apr. 6, 2018, Notice of Allowance dated Oct. 24, 2018.
U.S. Appl. No. 15/395,477, the Office Actions dated Nov. 2, 2018, Aug. 16, 2019, and Apr. 15, 2019.
U.S. Appl. No. 15/997,284, the Office Actions dated Aug. 1, 2019, Nov. 21, 2019 Apr. 28, 2020 and Dec. 8, 2020.
U.S. Appl. No. 15/863,191, now U.S. Appl. No. 10/257,578, the Notices of Allowance dated Jul. 5, 2018 and Nov. 23, 2018.
U.S. Appl. No. 16/591,103, the Office Action dated Apr. 22, 2020.

\* cited by examiner

INTELLIGENT BUFFERING OF LARGE-SCALE VIDEO

FIELD OF THE INVENTION

The present disclosure relates generally to interactive video and, more particularly, to systems and methods for intelligent buffering and seamless transitions in large scale video.

BACKGROUND

Immersive video experiences are offered in a variety of forms, including, but not limited to, 360-degree video presented on a two-dimensional display screen, virtual reality in simulated three-dimensional space, and augmented reality in physical three-dimensional space. One of the many challenges in providing such video experiences, particularly when video data is received over a network rather than being stored on local hardware, is ensuring that the viewer is able to visually navigate the video without encountering noticeable interruptions, such as pauses for buffering. Another challenge is transitioning among different videos within the three-dimensional space without drawing the user's attention to the changes and diminishing the immersive experience.

SUMMARY

Systems and methods for providing intelligent buffering and seamless transitions in large scale video are described herein. In one aspect, a computer-implemented method includes storing at least a portion of a video presentation having multiple sub-videos, with each sub-video being associated with a particular field of view. The field of view of a user viewing the video presentation is identified and, based thereon, a first set of sub-videos is loaded for presentation within the current field of view. In addition, a second set of sub-videos associated with proximate fields of view is loaded. A change in the user's field of view is then identified, and at least one sub-video from the second set is loaded for presentation within the new field of view.

Various implementations of the foregoing aspect can include one or more of the following features. A particular sub-video includes a plurality of video frames, with each frame including a portion of a frame of a larger video. A particular sub-video includes a plurality of video frames, with each frame including a first portion at a first resolution and a second portion at a second resolution lower than the first resolution. The change in the field of view is based on a user interaction (e.g., head movement, eye movement) with the video presentation. At least one of the second sub-videos is associated with the second field of view.

In another implementation, the method includes loading a third set of sub-videos associated with one or more fields of view proximate to the second field of view. This loading can be performed at an increased speed relative to further loading of the second sub-videos. The loading of the first set of sub-videos can also be stopped at this point.

In a further implementation, the first set of sub-videos includes a sub-video for immediate presentation within the first field of view and one or more different sub-videos for potential presentation within the first field of view. A transition in presentation within the first field of view from the sub-video for immediate presentation to one of the different sub-videos can be identified, where the transition is based on an interaction of the user. Such interactions can include a head movement, an eye movement, speech, a hand movement, an arm movement, and an input from a control device. The loading of the different sub-videos can be based on a current field of view of the user and/or a probability that the user will have a particular field of view. The second set of sub-videos can also include a sub-video for immediate presentation within the second field of view and one or more other sub-videos for potential presentation within the second field of view.

In yet another implementation, the method includes associating a weight with each sub-video being loaded based on a probability of that sub-video being viewed by the user. The loading speed a particular sub-video can then be based at least in part on the weight associated therewith.

In another aspect, a computer-implemented method includes providing, for presentation to a user, a video having multiple sub-videos. A first distraction level based on content in the video and a second distraction level based on one or more actions of the user during the presentation of the video are tracked. Based on either or both distraction levels, a transition point in the video is identified during the presentation of the video. One of the sub-videos is then changed to a different sub-video at the transition point.

Various implementations of the foregoing aspect can include one or more of the following features. The video is presented in a simulated three-dimensional space. A subplurality of the sub-videos is presented simultaneously to the user. The first sub-video is presented within a field of view of the user. A particular sub-video includes a plurality of video frames, each frame including a portion of a frame of a larger video. A particular sub-video includes a plurality of video frames, each frame including a plurality of distinct portions.

In one implementation, tracking the first level of distraction includes identifying object movement in a particular sub-video, an object occlusion in a particular sub-video, a distracting video scene, and/or distracting audio. Tracking the second level of distraction can include identifying a change in a field of view of the user, an eye focus of the user, and/or a movement direction of the user. The first distraction level can be determined prior to the presentation of the video and/or determined during the presentation of the video.

In another implementation, identifying the transition point includes determining at a particular point in time that a combination of the first distraction level and the second distraction level exceed a threshold level of distraction, or that the first distraction level exceeds a threshold level of distraction, or that the second distraction level exceeds a threshold level of distraction. The change to the different sub-video can occur immediately upon identifying the transition point.

Other aspects of the inventions include corresponding systems and computer-readable media. The various aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

DETAILED DESCRIPTION

Described herein are various implementations of methods and supporting systems for providing intelligent buffering and seamless transitions in multimedia content, such as large scale video. As referred to here, "large scale video" refers to video having a total display area that is larger than the viewing area for a user during a particular period (up to and including the entire duration) of a playing video. A large scale video can be composed of a single large area sub-video or multiple sub-videos each comprising a portion of the large scale video area (e.g., arranged in a grid). Some large scale videos, during playback or streaming, permit the viewer to change his field of view, or viewing area, to watch other portions of the video area. For example, a large scale video can be presented in a two-dimensional or three-dimensional representative space (e.g., projected on a spherical surface, virtual reality, augmented reality, or a form of spatial or immersive media using one or more of computer generated imagery, pre-recorded video, wide angle video, and the like), where the user can turn his head, move his eyes, or provide other input to change where he is looking, effectively moving his viewing area to another portion of the video. The viewing area can be representative of the area that a viewer would see within his cone of vision (e.g., from a first-person perspective).

The techniques described herein can be implemented in any appropriate hardware or software. If implemented as software, the processes can execute on a system capable of running one or more custom operating systems or commercial operating systems such as the Microsoft Windows® operating systems, the Apple OS X® operating systems, the Apple iOS® platform, the Google Android™ platform, the Linux® operating system and other variants of UNIX® operating systems, and the like. The software can be implemented on a general purpose computing device in the form of a computer including a processing unit, a system memory, and a system bus that couples various system components including the system memory to the processing unit.

Figure 1:
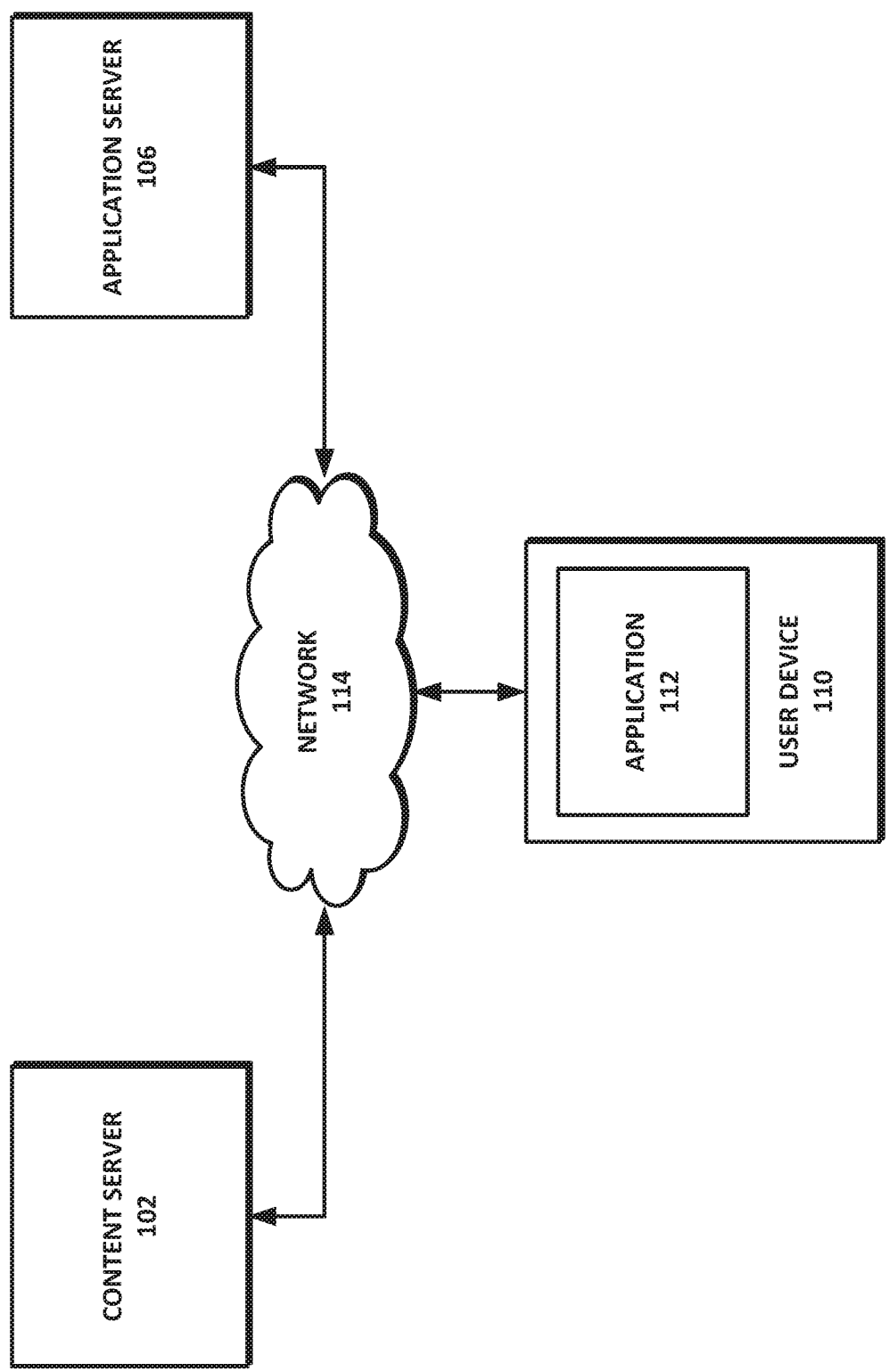
FIG. 1 depicts a high-level system architecture according to an implementation.

Referring to FIG. 1, large scale video content can be presented to a user on a user device 110 having an application 112 capable of playing and/or editing the content. The user device 110 can be, for example, a virtual reality headset or other device (e.g., Oculus Rift®, Samsung Gear VR®, PlayStation® VR, etc.), a smartphone, tablet, laptop, palmtop, wireless telephone, television, gaming device, music player, mobile telephone, information appliance, workstation, a smart or dumb terminal, network computer, personal digital assistant, wireless device, minicomputer, mainframe computer, or other computing device, that is operated as a general purpose computer or a special purpose hardware device that can execute the functionality described herein.

The system can include a plurality of software modules stored in a memory and executed on one or more processors. The modules can be in the form of a suitable programming language, which is converted to machine language or object code to allow the processor or processors to read the instructions. The software can be in the form of a standalone application, implemented in any suitable programming language or framework.

The application 112 can be a video player and/or editor that is implemented as a native application, web application, or other form of software. In some implementations, the application 112 is in the form of a web page, widget, and/or Java, JavaScript, .Net, Silverlight, Flash, and/or other applet or plug-in that is downloaded to the user device 110 and runs in conjunction with a web browser. The application 112 and the web browser can be part of a single client-server interface; for example, the application 112 can be implemented as a plugin to the web browser or to another framework or operating system. Any other suitable client software architecture, including but not limited to widget frameworks and applet technology can also be employed.

Multimedia content can be provided to the user device 110 by content server 102, which can be a web server, media server, a node in a content delivery network, or other content source. In some implementations, the application 112 (or a portion thereof) is provided by application server 106. For example, some or all of the described functionality of the application 112 can be implemented in software downloaded to or existing on the user device 110 and, in some instances, some or all of the functionality exists remotely. For example, certain video encoding and processing functions can be performed on one or more remote servers, such as application server 106. In some implementations, the user device 110 serves only to provide output and input functionality, with the remainder of the processes being performed remotely.

The user device 110, content server 102, application server 106, and/or other devices and servers can communicate with each other through communications network 114. The communication can take place via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network 114 can carry TCP/IP protocol communications and HTTP/HTTPS requests made by a web browser, and the connection between clients and servers can be communicated over such TCP/IP networks. The type of network is not a limitation, however, and any suitable network can be used.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

In one implementation, interactive large scale video is provided in a three-dimensional (real or actual) space, such as through a virtual reality device. The video within or outside a user's viewing area can transition (change seamlessly or non-seamlessly) in real-time, as the user interacts with the environment. As noted above, a large scale video can be a single large area video, or can be made of multiple videos or frame portions, each positioned as a portion of the area of a larger area video canvas. For a single large area video, the video is buffered to the player application 112 on the user device 110, and the entire video is switched to effect a transition in a particular area of the video. For video portions, one or more small videos or frame portions can be buffered to the player application 112 and can be copied in real-time, as the video is playing, to a canvas that is displayed to the user frame by frame. Changes in an area of the video then can be accomplished by switching only the video or frame portion or portions in the relevant area. The underlying canvas can be empty or can hold a default video for display to the user when other video is unavailable.

Various video structuring techniques can be used to provide transitions in large scale video. In some implementations, a video presentation includes multiple tracks or streams that a user can switch among in real-time or near real-time. In one implementation, the video presentation is an interactive video based on a video tree, hierarchy, or other structure. A video tree can be formed by nodes that are connected in a branching, hierarchical, or other linked form. Nodes can have an associated video segment, audio segment, graphical user interface elements, and/or other associated media. Users (e.g., viewers) can watch a video that begins from a starting node in the tree and proceeds along connected nodes. Upon reaching a point where multiple video segments branch off from a currently viewed segment, the user interacts with the video in a manner that results in the selection of the branch to traverse and, thus, the next video segment to watch. Branched video can include seamlessly assembled and selectably presentable multimedia content such as that described in U.S. patent application Ser. No. 13/033,916, filed on Feb. 24, 2011, and entitled "System and Method for Seamless Multimedia Assembly," and U.S. patent application Ser. No. 14/107,600, filed on Dec. 16, 2013, and entitled "Methods and Systems for Unfolding Video Pre-Roll," the entireties of which are hereby incorporated by reference.

The video segments in a video tree can be selectably presentable multimedia content; that is, some or all of the video segments in the video tree can be individually or collectively played for a user based upon the user's selection of a particular video segment, an interaction with a previous or playing video segment, or other interaction that results in a particular video segment or segments being played. The video segments can include, for example, one or more predefined, separate multimedia content segments that can be combined in various manners to create a continuous, seamless presentation such that there are no noticeable gaps, jumps, freezes, delays, or other visual or audible interruptions to video or audio playback between segments. In addition to the foregoing, "seamless" can refer to a continuous playback of content that gives the user the appearance of watching a single, linear multimedia presentation or portion of a presentation, as well as a continuous playback of multiple content segments that have smooth audio and/or video transitions (e.g., fadeout/fade-in, linking segments) between two or more of the segments.

In some instances, the user is permitted to make choices or otherwise interact in real-time at decision points or during decision periods interspersed throughout the multimedia content. Decision points and/or decision periods can occur at any time and in any number during a multimedia segment, including at or near the beginning and/or the end of the segment. Decision points and/or periods can be predefined, occurring at fixed points or during fixed periods in the multimedia content segments. Based at least in part on the user's interactions before or during the playing of content, one or more subsequent multimedia segment(s) associated with the choices can be presented to the user. In some implementations, the subsequent segment is played immediately and automatically following the conclusion of the current segment, whereas, in other implementations, the subsequent segment is played immediately upon the user's interaction with the video, without waiting for the end of the decision period or the segment itself.

If a user does not make a selection at a decision point or during a decision period, a default, previously identified selection, or random selection can be made by the system. In some instances, the user is not provided with options; rather, the system automatically selects the segments that will be shown based on information that is associated with the user, other users, or other factors, such as the current date. For example, the system can automatically select subsequent segments based on the user's IP address, location, time zone, the weather in the user's location, social networking ID, saved selections, stored user profiles, preferred products or services, and so on. The system can also automatically select segments based on previous selections made by other users, such as the most popular suggestion or shared selections. The information can also be displayed to the user in the video, e.g., to show the user why an automatic selection is made. As one example, video segments can be automatically selected for presentation based on the geographical location of three different users: a user in Canada will see a twenty-second beer commercial segment followed by an interview segment with a Canadian citizen; a user in the U.S. will see the same beer commercial segment followed by an interview segment with a U.S. citizen; and a user in France is shown only the beer commercial segment.

Multimedia segment(s) selected automatically or by a user can be presented immediately following a currently playing segment, or can be shown after other segments are played. Further, the selected multimedia segment(s) can be presented to the user immediately after selection, after a fixed or random delay, at the end of a decision period, and/or at the end of the currently playing segment. Two or more combined segments form a seamless multimedia content path, and users can take multiple paths and experience a complete, start-to-finish, seamless presentation. Further, one or more multimedia segments can be shared among intertwining paths while still ensuring a seamless transition from a previous segment and to the next segment. The content paths can be predefined, with fixed sets of possible transitions in order to ensure seamless transitions among segments. There can be any number of predefined paths, each having any number of predefined multimedia segments. Some or all of the segments can have the same or different playback lengths, including segments branching from a single source segment.

Traversal of the nodes along a content path in a tree can be performed by selecting among options that appear on and/or around the video while the video is playing. In some implementations, these options are presented to users at a decision point and/or during a decision period in a content segment. The display can hover and then disappear when the decision period ends or when an option has been selected. Further, a timer, countdown or other visual, aural, or other sensory indicator can be presented during the playing of a content segment to inform the user of the point by which he should (or in some cases must) make his selection. For example, the countdown can indicate when the decision period will end, which can be at a different time than when the currently playing segment will end. If a decision period ends before the end of a particular segment, the remaining portion of the segment can serve as a non-interactive seamless transition to one or more other segments. Further, during this non-interactive end portion, the next multimedia content segment (and other potential next segments) can be downloaded and buffered in the background for later presentation (or potential presentation).

The segment that is played after a currently playing segment can be determined based on an option selected or other interaction with the video. Each available option can result in a different video and audio segment being played. As previously mentioned, the transition to the next segment can occur immediately upon selection, at the end of the current segment, or at some other predefined or random point. Notably, the transition between content segments can be seamless. In other words, the audio and video can continue playing regardless of whether a segment selection is made, and no noticeable gaps appear in audio or video presentation between any connecting segments. In some instances, the video continues on to another segment after a certain amount of time if none is chosen, or can continue playing in a loop.

In another implementation, transitions among videos can be performed using the techniques described in U.S. patent application Ser. No. 14/534,626, filed on Nov. 6, 2014, and entitled "Systems and Methods for Parallel Track Transitions," the entirety of which is incorporated by reference herein. For example, a playing video file or stream can have one or more parallel tracks that can be switched to and from in real-time automatically and/or based on user interactions. In some implementations, such switches are made seamlessly and substantially instantaneously, such that the audio/video of the playing content can continue without any perceptible delays, gaps, or buffering.

To facilitate near-instantaneous switching among parallel tracks, multiple media tracks (e.g., video streams) can be downloaded simultaneously to user device 110. Upon selecting a streaming video to play, an upcoming portion of the video stream is typically buffered by a video player prior to commencing playing the video, and the video player can continue buffering as the video is playing. Accordingly, in one implementation, if an upcoming segment of a video presentation (including the beginning of the presentation) includes two or more parallel tracks, the application 112 (e.g., a video player) can initiate download of the upcoming parallel tracks substantially simultaneously. The application 112 can then simultaneously receive and/or retrieve video data portions of each track. The receipt and/or retrieval of upcoming video portions of each track can be performed prior to the playing of any particular parallel track as well as during the playing of a parallel track. The downloading of video data in parallel tracks can be achieved in accordance with smart downloading techniques such as those described in U.S. Pat. No. 8,600,220, issued on Dec. 3, 2013, and entitled "Systems and Methods for Loading More than One Video Content at a Time," the entirety of which is incorporated by reference herein.

Upon reaching a segment of the video presentation that includes parallel tracks, the application 112 makes a determination of which track to play. The determination can be based on, for example, an interaction made or option selected by the user during a previous video segment, during a previous playback of a pre-recorded video presentation, prior to playing the video, and so on. Based on this determination, the current track either continues to play or the application 112 switches to a parallel track.

The above video structuring concepts, among other techniques, can be applied to large scale video to effect transitions in all or a portion of the area of a large scale video (e.g., sub-videos) based on a user interaction. In particular, multiple sub-videos, or the entire large scale video itself, can transition to other videos or segments using these branching video or parallel track transition techniques. As one basic example, consider a large scale video presented in a sphere and allowing a user to look around in 360 degrees, which includes two sub-videos consisting of video played on opposite sides, or hemispheres, of the total viewing area. To transition to a new video in one hemisphere without the user noticing, the user device (e.g., a VR headset) can be used to determine when the user is viewing the opposite hemisphere. At that time, the playing video in the first hemisphere can be transitioned to the new video with minimal or no recognition of the change by the user.

Various types of user interactions and controls can affect the presentation of a large scale video and result in changes to the entire video or one or more sub-videos. Certain interactions are particularly useful in virtual reality environments. For example, the head movement of a user (determined by a VR headset, motion tracker, device with a gyroscope, or otherwise) and/or eye movement of a user (determined by image recognition or otherwise) can be used to set the field of view of the user and what he sees on his screen or other display device. Head and eye movement can also be used to determine which sub-video(s) to start playing or transition to. For example, in a video showing a person to the user's left and a person to the user's right, a movement of the user's head and/or eyes toward a particular person can be used to determine which person will begin talking to the user (i.e., which video with the person talking will be transitioned to). Similarly, head movement, eye movement, blinking, and other facial expressions can be used to indicate a user's selection of an option (e.g., nodding as "yes", shaking head as "no"). With respect to eye movement, detection of such eye motion can also include detection of eye focus. For example, if it is determined that the user is staring at a particular object in the video, a transition can be made to a video in which the object performs an action (e.g., a bird flies away).

Other interactions that result in a change in a user's field of view, a change in video being played, or a choice being selected are contemplated. For example, human speech can be analyzed using voice recognition techniques, allowing a user to speak to characters in a video or make requests. Depending on what the user says, different sub-video(s) can be transitioned to in the large scale video. Other possible interactions affecting the video include general body movement, hand, finger, or arm movement, leg or foot movement, movement of a control device (e.g., gloves, sword, video game controller, watch), and other suitable methods of interaction.

In one implementation, large scale video is intelligently buffered on the user device 110 so that the user's field of view can change while videos in surrounding areas are seamlessly loaded, without noticeable interruption. To accomplish this, the application 112 on the user device 110 can intelligently request media content that will be played or is likely to be played, or the content server 102 can intelligently select what media content to transmit to the user device 110, or a combination of both techniques can occur. Different types of buffering are possible, including buffering content for period of time in the future (e.g., a fixed period or a period that can vary given the likelihood of particular content being played or otherwise seen by a user); buffering video content directly within the user's field of view; buffering video content directly within the user's field of view and an area around the field of view; and buffering an entire video or all sub-videos that can possibly be viewed (which can vary given, e.g., a defined video tree or other structure).

Figure 2:
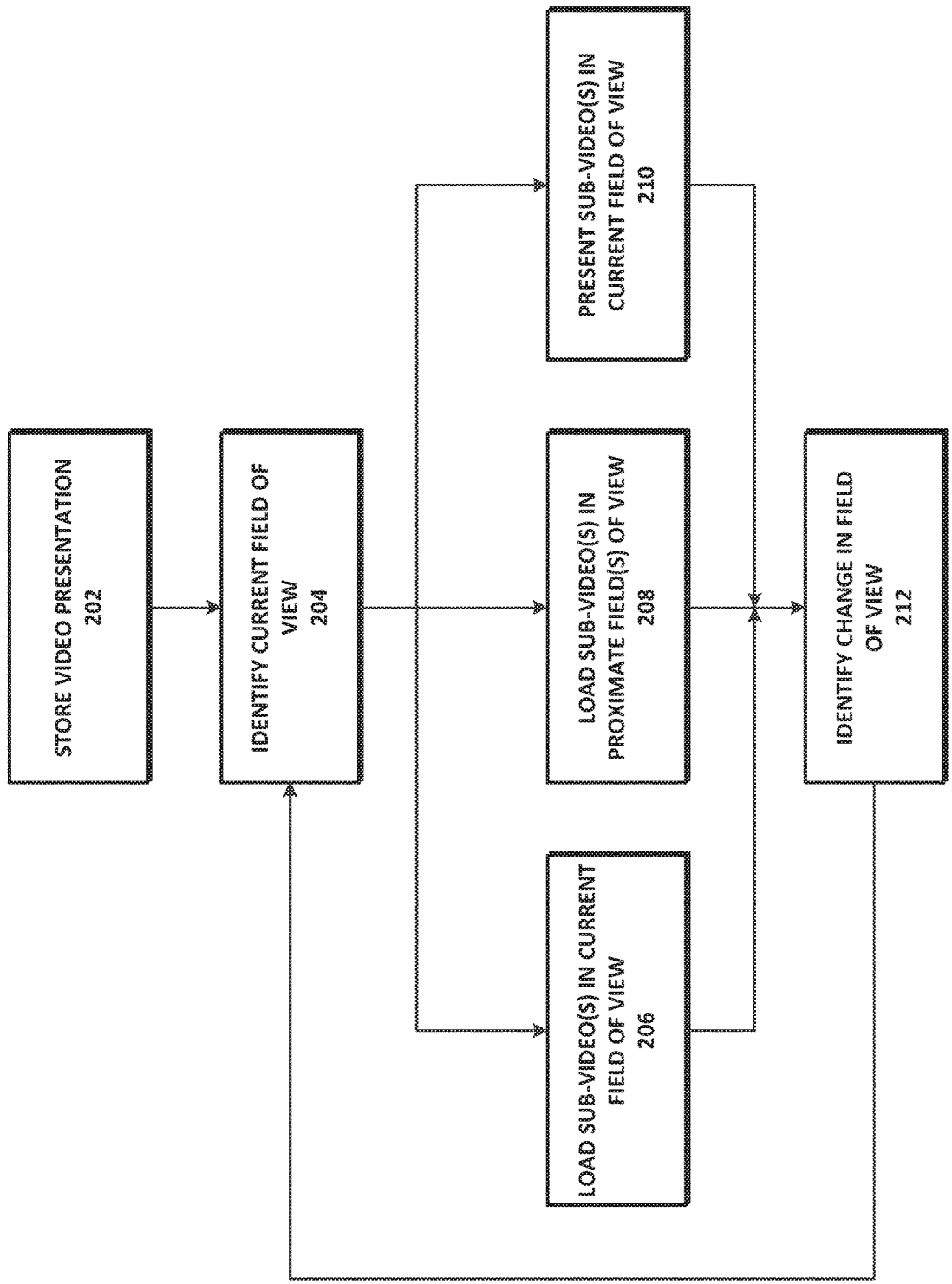
FIG. 2 depicts a method for intelligent buffering of large scale video according to an implementation.

FIG. 2 depicts one implementation of a general process for intelligently buffering large scale video. The large scale video, or at least a portion thereof, is stored on content server 102 and/or user device 110 (STEP 202). The video can be composed of multiple sub-videos, each associated with a possible field of view of a user viewing the video. For example, when the user begins watching the large scale video, he may have a set of several sub-videos playing within his field of view. Upon looking to the left, a different set of sub-videos is visible within the user's new field of view. Fields of view can overlap, and thus each sub-video can be associated with one or more fields of view. Thus, in the preceding video, the different set of sub-videos might include sub-videos from the first set in the original field of view.

In STEP 204, the current field of view of the user is identified (e.g., by the user device 110 or using information provided to the content server 102 or other remote device). In parallel, one or more sub-videos within the current field of view of the user are loaded to user device 110 for display to the user (STEP 206), one or more sub-videos in fields of view proximate to the current field of view (which can include fields of view overlapping with the current field of view) are loaded to user device 110 for potential display to the user (STEP 208), and the sub-videos in the current field of view are presented to the user (STEP 210). In some implementations, STEPS 206, 208, and 210 need not be performed in parallel. Upon identifying a change in the field of view of the user (STEP 212), the process returns to STEP 204 to load sub-videos within and proximate to the new field of view to user device 110, and the sub-videos within the new field of view are presented to the user.

Figure 3A:
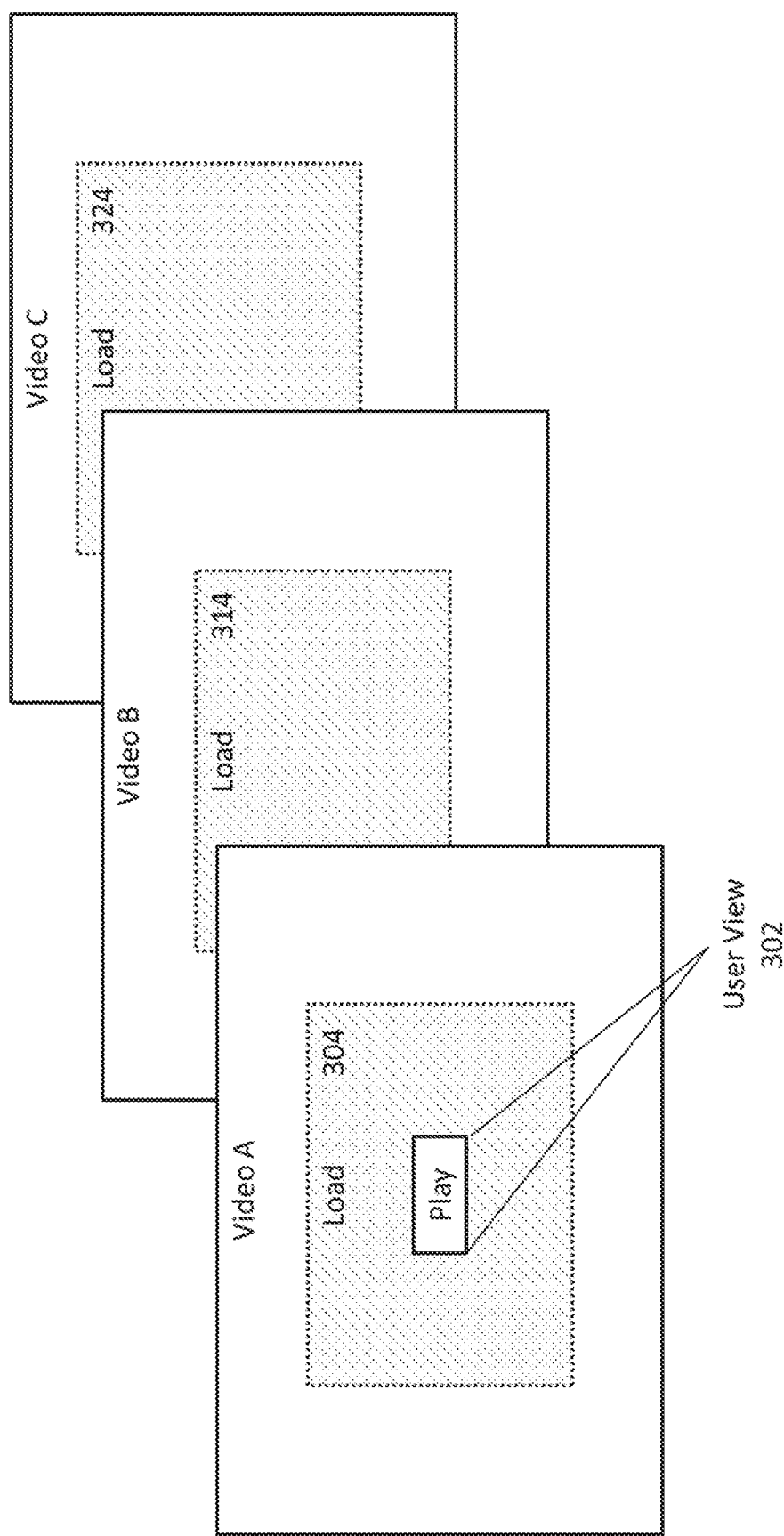
FIGS. 3A-3C depict changes in video loading and display areas based on changes in a user's field of view.
Figure 3B:
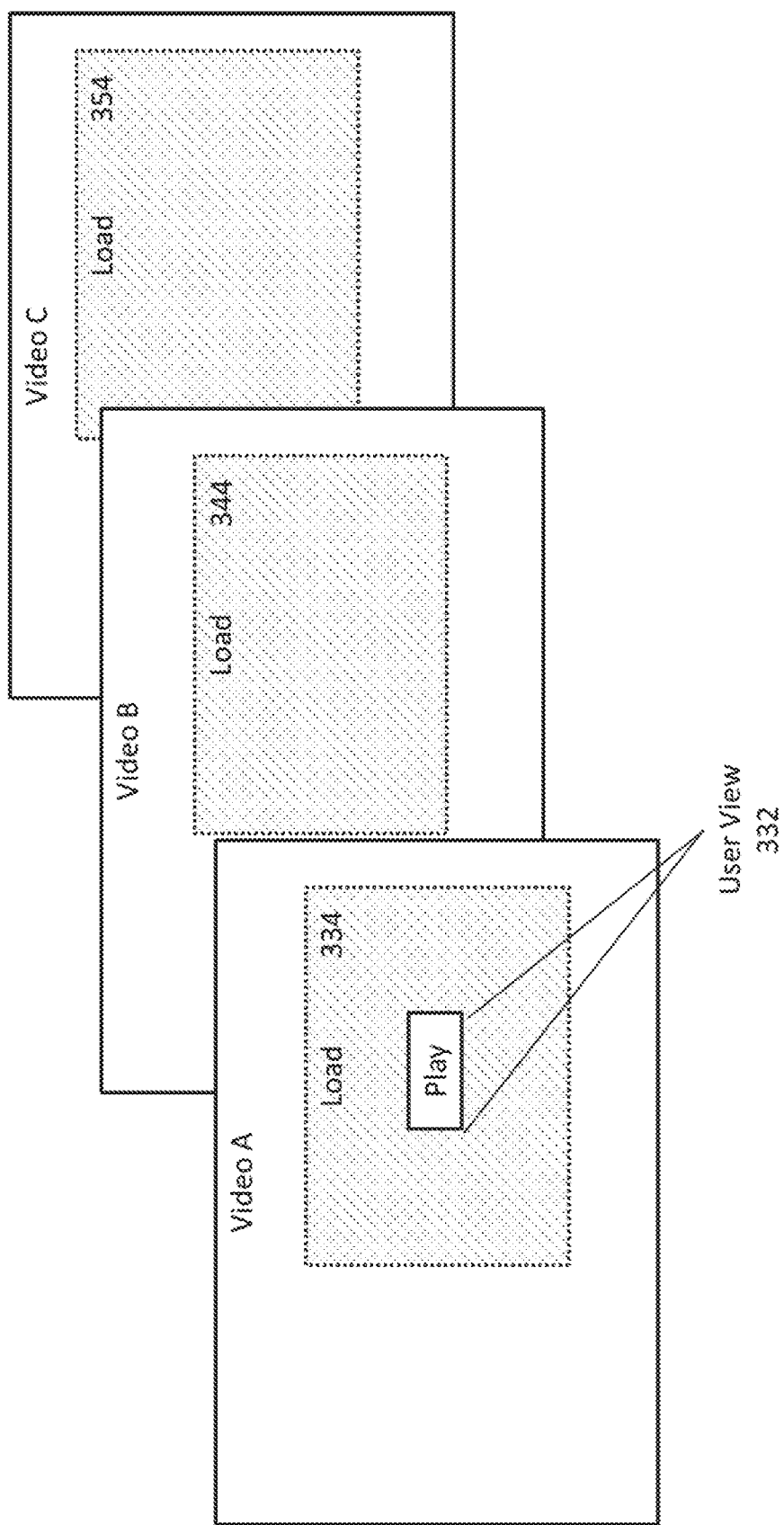
Figure 3C:
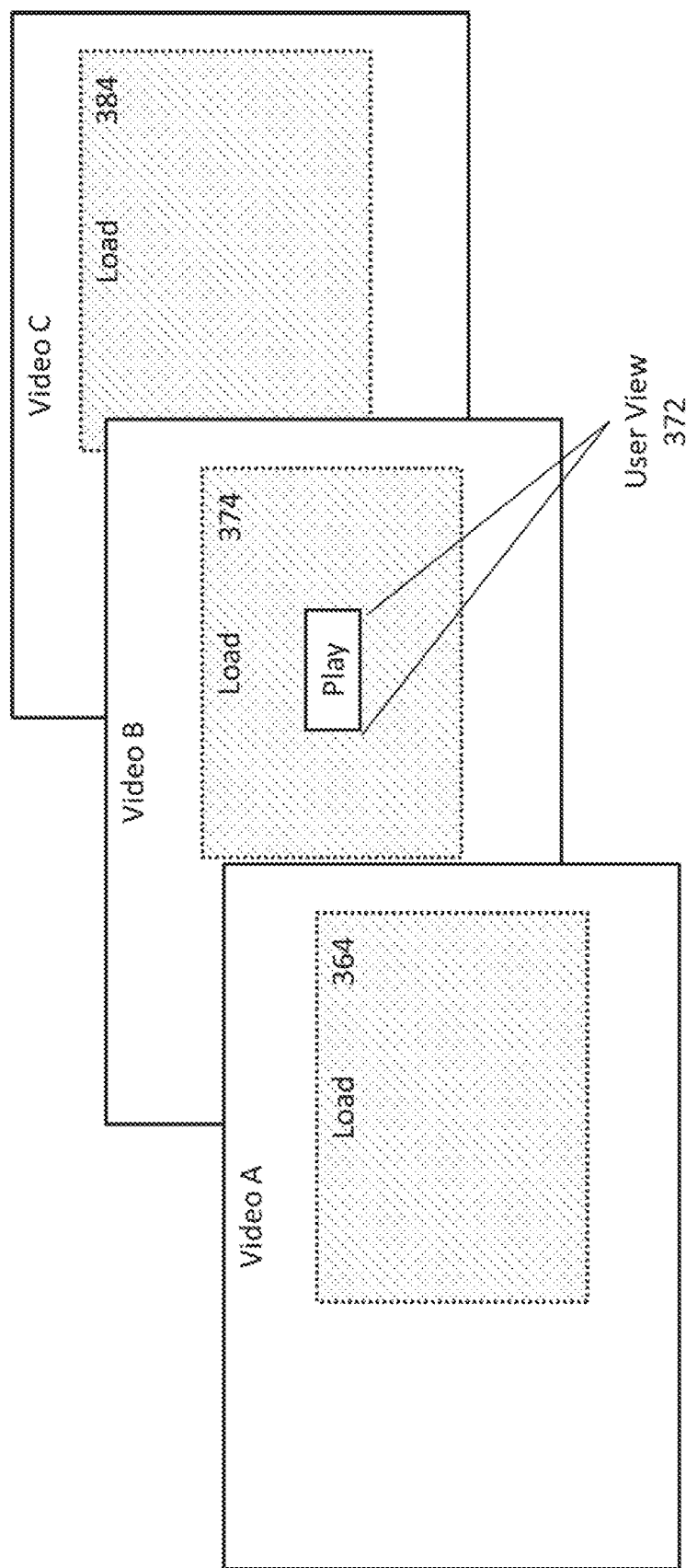

Referring now to FIGS. 3A-3C, in one particular implementation of the intelligent buffering technique using a parallel tracks video structure, video content is loaded based on a user's current field of view and the availability of parallel videos that can be switched to. In FIG. 3A, the user is viewing Video A directly ahead, with his field of view designated by area 302 and proximate fields of view designated by area 304. In some implementations, area 302 represents the viewing area within the center of gaze of the viewer, and area 304 represents viewing areas within various degrees of the user's peripheral vision. Other configurations are contemplated. The sub-videos within area 302 are loaded and presented to the user, while sub-videos within area 304 are loaded for potential presentation to the user (e.g., in the event the user's gaze changes, head turns, etc.). In addition, video content from parallel tracks Video B and Video C are loaded as well, specifically within areas 314 and 324, which correspond spatially within the video to areas 302 and 304 together, to provide for seamless transition among parallel tracks regardless of where the user is looking within area 304.

FIG. 3B shows that, when the user looks to the right (or his gaze is automatically directed to the right), his field of view shifts to area 332 and the proximate fields of view are now defined by area 334. Because area 332 is contained within a visual area in which video content was previously loaded for potential viewing (i.e., area 304), the video within area 332 can instantly commence playing without the need to retrieve content over a network from a remote server, which would result in a noticeable delay in the transition. As was described with respect to FIG. 3A, video content within the proximate fields of view 334 and corresponding parallel track visual areas 344 and 354 can continue loading. In some implementations, video content that was previously but is no longer within a loading area can cease loading. For example, with respect to Video A, video content within the non-overlapping portion of areas 304 and 334 can stop loading when the user looks to the right.

When the user switches to a parallel track Video B (whether as a result of a user interaction or an automatic transition), as shown in FIG. 3C, the video content that was previously loaded in area 344 and that corresponds to the user's current field of view 372 can immediately and seamlessly commence playing for the user. Again, video content can continue loading within proximate fields of view 374 and parallel track visual areas 364 and 384 in Videos A and C, respectively, which both spatially correspond to the area defined by areas 372 and 374 in Video B. Further, video content that was previously but is no longer within a loading area can cease loading.

Figure 4:
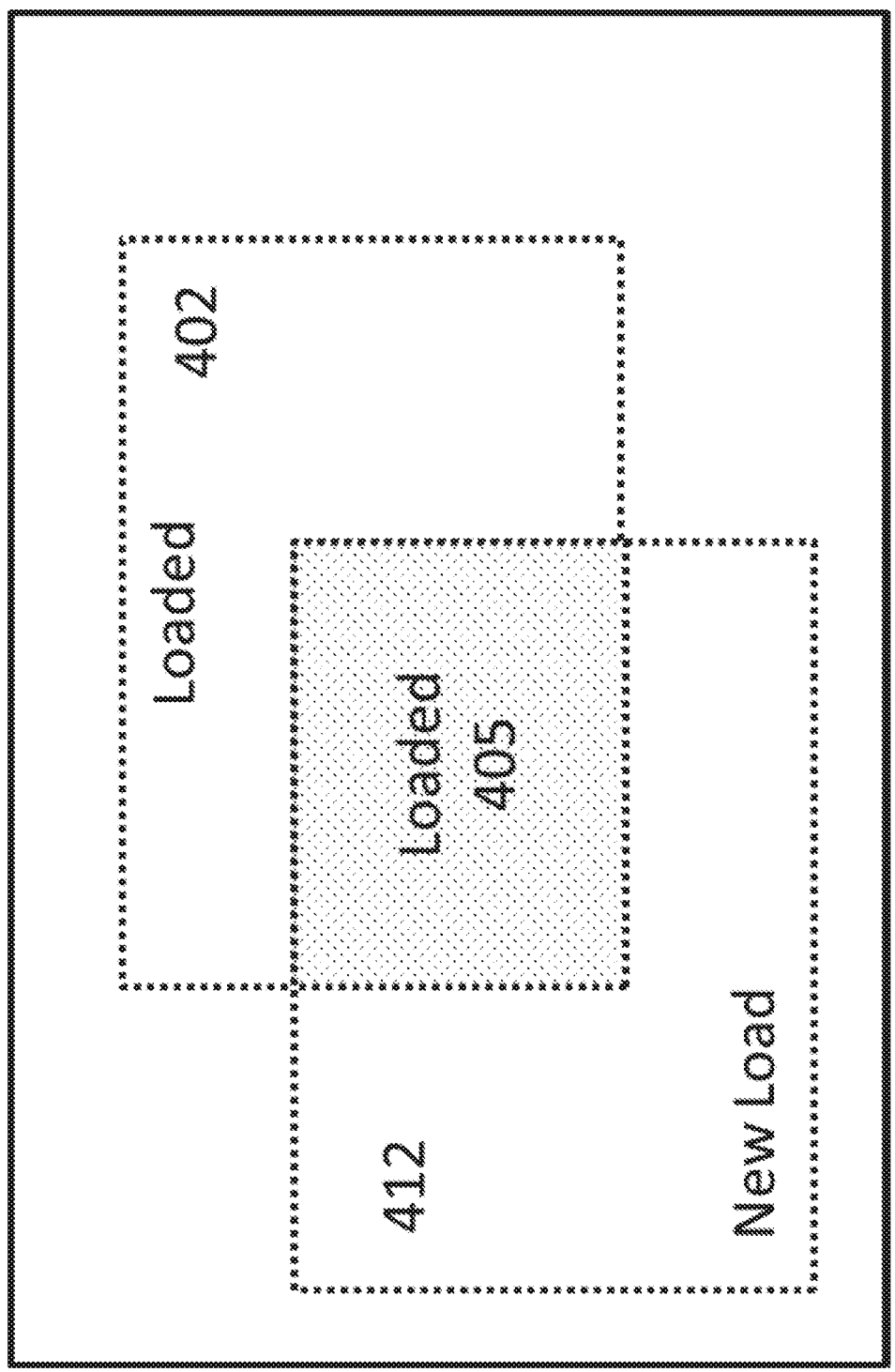
FIG. 4 depicts overlapping video loading areas.

In one implementation, specific areas of video content can be loaded more or less quickly relative to other areas. As described above, while a user is viewing a large scale video, video content within his field of view as well as within proximate fields of view is buffered. With reference to FIG. 4, video content in areas 402 and 405 has been buffered in a manner described herein (e.g., loaded up to a particular point in time) because, for example, the user's field of view was previously or is currently within the areas 402 and/or 405. If the user's field of view shifts down and to the left, the area defining which video content should be loaded correspondingly changes from areas 402 and 405 to areas 405 and 412. Video content in 402 can stop loading. In this case, because of the overlap of the first and second loading areas at area 405, some video content in area 405 will already have been loaded. However, area 412, being an entirely new loading area, will have no video content yet loaded. To coordinate the loading of video content in the loading area defined by areas 405 and 412, video in area 412 can be loaded faster than video in area 405 until the same or about the same temporal amount of video has been loaded for both areas 405 and 412. This can be accomplished by, for example, dividing the large scale video into multiple sub-videos that make up individual area portions of the larger area video and selecting the appropriate sub-videos for loading, or by maintaining video content in storage in a manner that allows for the retrieval of specific portions of each video.

Figure 5:
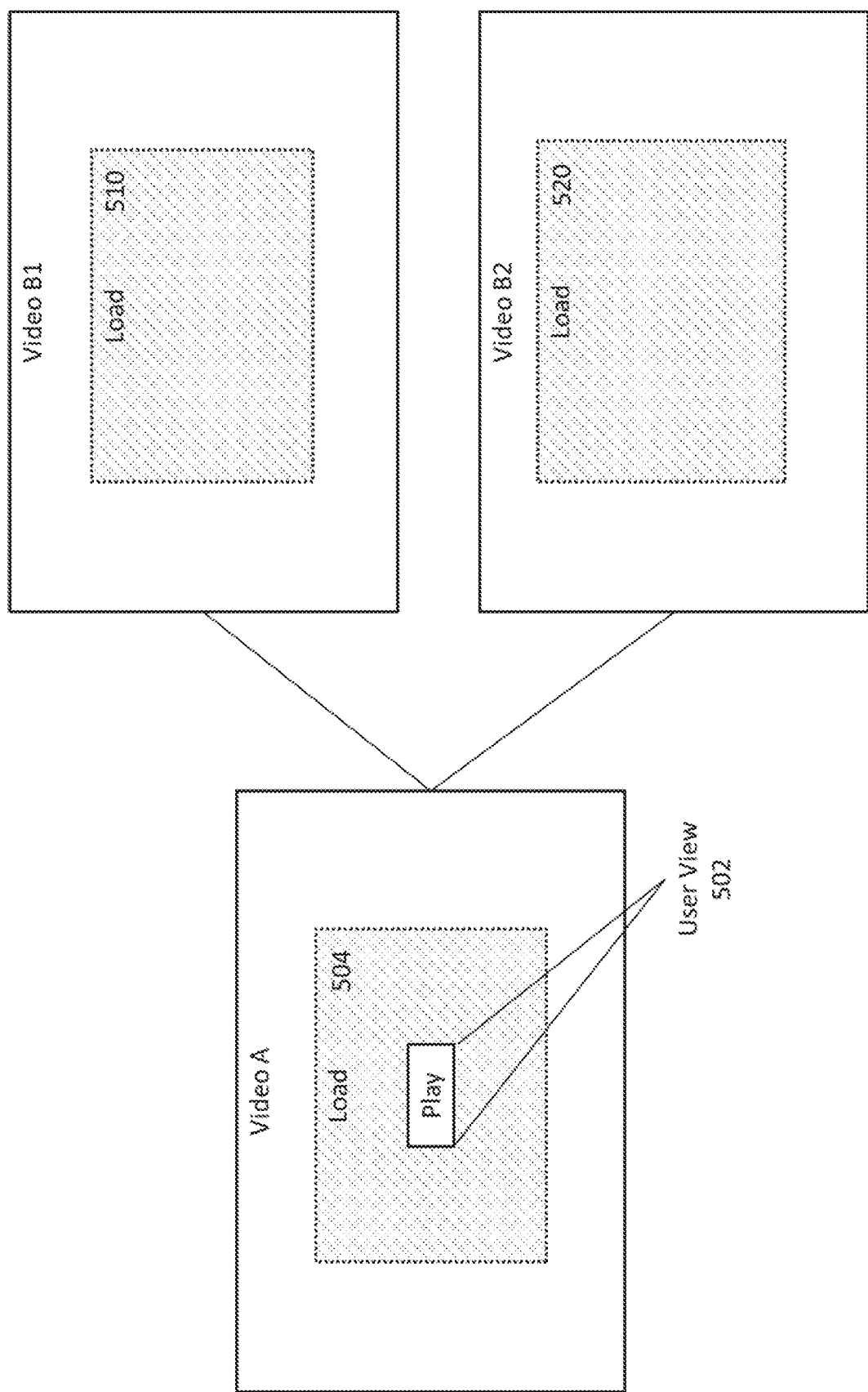
FIGS. 5-7 depict possible video loading areas for branching video.
Figure 6:
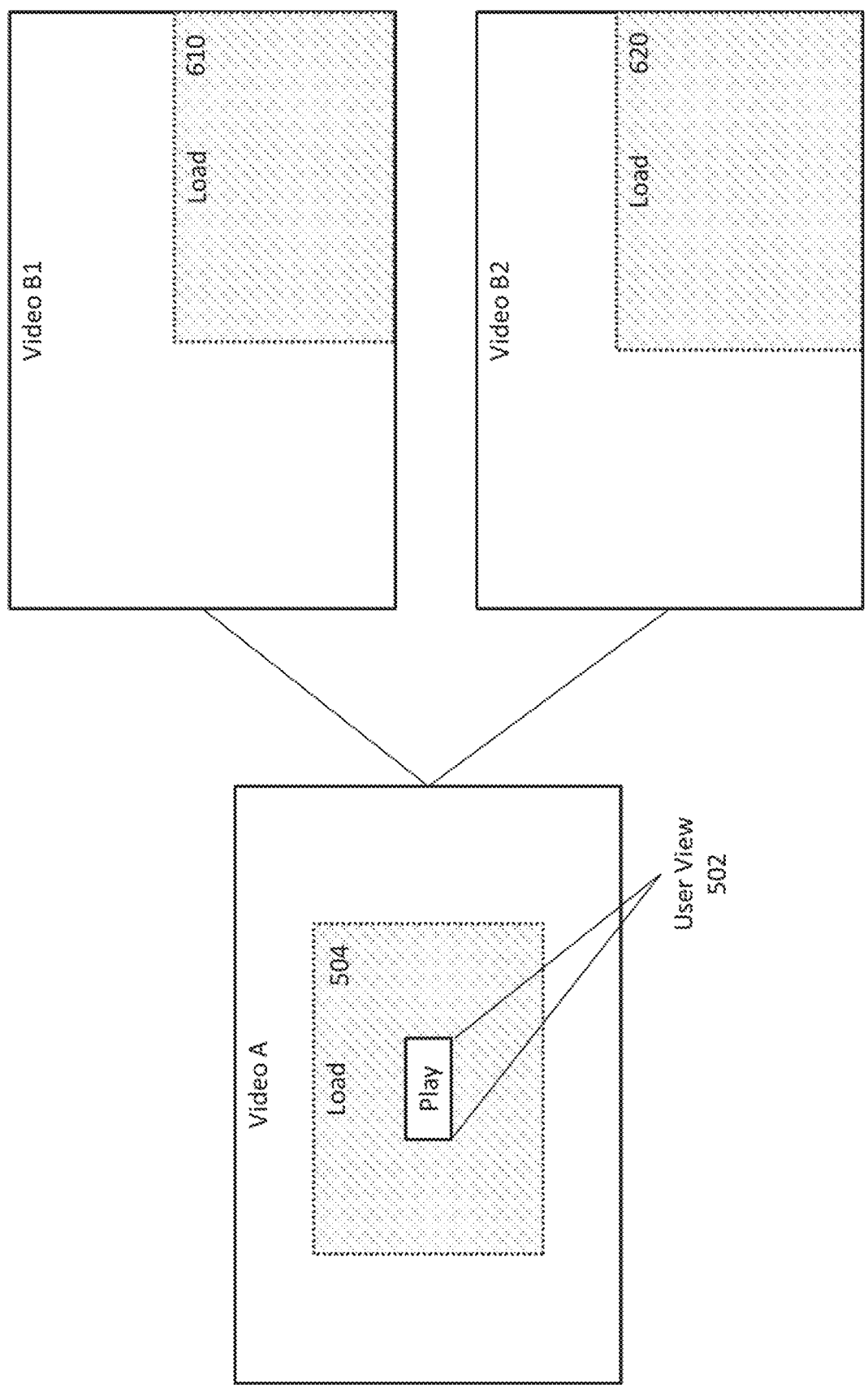
Figure 7:
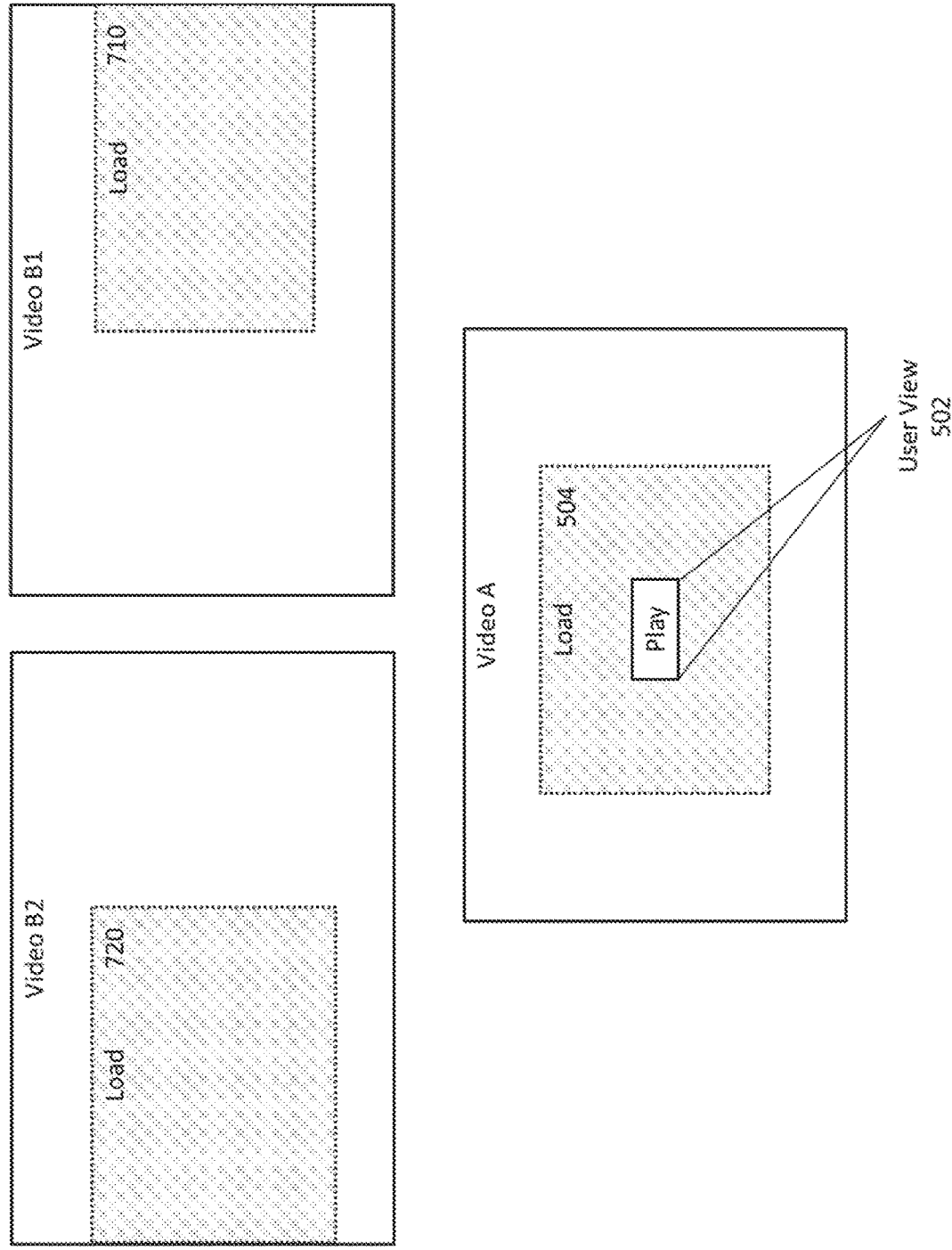

Referring now to FIGS. 5-7, in one particular implementation of the intelligent buffering technique using a branching video tree structure, video content is loaded based on a user's current field of view and paths defined by the video tree. As described above, in a branching video, a user transitions from one video segment to one of multiple different segment options (i.e., branches) automatically or based on choices or interactions of the user. For large scale videos with many different possible video segments in a video tree, it may be infeasible to buffer the full universe of segments in the tree for all viewing areas of the video. Similarly to the parallel tracks implementation, above, video content within the user's field of view and proximate fields of view can be loaded. However, for potentially viewable video segments in branches of the video tree, various techniques are available for intelligently selecting which of these potentially viewable segments to buffer.

FIG. 5 shows a simple video tree structure in which Videos B1 and B2 are branching options following Video A. In the depicted technique, the areas selected for loading in Videos B1 and B2 (areas 510 and 520, respectively) are those that spatially correspond to the loading area defined by field of view 502 and proximate fields of view 504 in Video A. Thus, regardless of whether the user transitions from Video A to Video B1 or Video B2 (and assuming the user maintains his field of view within the applicable loading area 510 or 520), there will be buffered video available that can be seamlessly presented to the viewer. If the viewer changes his field of view, the loading area can be moved accordingly.

FIG. 6 depicts the same video tree structure as in FIG. 5; however, in this technique, the areas selected for loading in Videos B1 and B2 (areas 610 and 620, respectively) are those that have a high (or highest) probability of being viewed by the user on transitioning to that video. Although FIG. 6 shows contiguous loading areas 610, 620, there can be multiple, non-contiguous loading areas (e.g., the three most likely areas to which the user will direct his gaze). Further, although FIG. 6 depicts Video B1 and Video B2 having spatially corresponding loading areas 610, 620, each video can have loading areas in different locations, e.g., if Video B1 and Video B2 have different areas that are more likely to be viewed. The determination of which areas of a video are most likely to be viewed can be based on the content, historical statistics regarding actual viewing data, observed user behavior, and other suitable information.

In FIG. 7, Videos B1 and B2 are video segments that can be jumped to in the video tree, rather than segments directly branching from Video A. In this technique, the video loading areas 710, 720 for jump-to Video Segments B1 and B2 are selected based on what the user will be directed to when navigating the video tree in this manner. In this example, when the user looks to his right, Video A transitions to Video B1, with the user's field of view being positioned within loading area 720. Similarly, if the user instead looks to his left, Video A transitions to Video B1, with the user's field of view being positioned within loading area 710.

Figure 8:
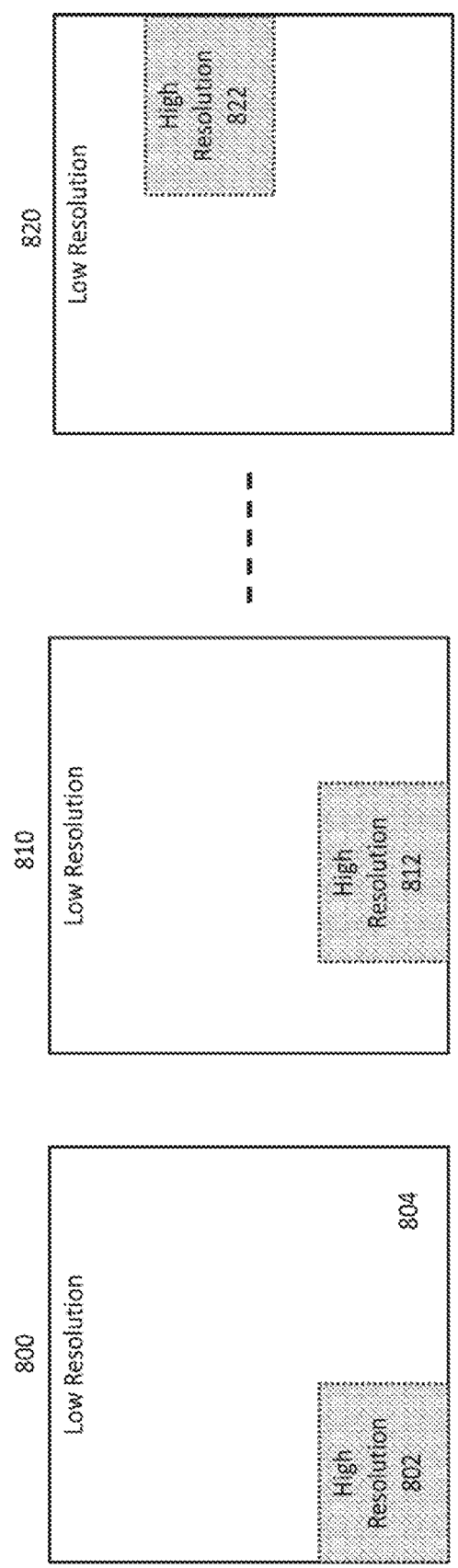
FIG. 8 depicts a large scale video loaded in multiple resolutions.

In one implementation, large scale videos are provided in multiple resolutions. For example, a large scale video presentation can be composed of individual, full-size (encompassing the full viewable area of the large scale video presentation) sub-videos, with each video frame of the sub-video being broken up into sub-areas of different resolution. Alternatively, the large scale video presentation can be composed of multiple sub-videos spatially arranged to form multiple full-size videos, with one or more of the sub-videos being encoded in a different resolution from other sub-videos. FIG. 8 depicts a simple example of this concept, in which a full-size sub-video 800 has a high-resolution sub-area 802 and a low resolution sub-area 804 in each video frame. This sub-video 800 is shown to the user when the user's field of view corresponds with the high-resolution sub-area 802. In this manner, video content in the user's field of view is provided in higher detail than video content in the surrounding areas, allowing for a smaller compressed file size and reduced usage of bandwidth. In some implementations, the high-resolution sub-area 802 corresponds to the user's center of gaze, and one or more lower resolutions are used for video in the user's peripheral vision or outside the user's field of view altogether.

Other sub-videos 810, 820 can have different sub-areas 812, 822 in high resolution. Accordingly, when the user changes his field of view, a seamless transition is made to the sub-video having a high resolution area corresponding to the new field of view. In this manner, less data is buffered and a change in video quality is not observable to the user.

In some implementations, the loading of video content is optimized by applying weights to the content based on the probability that the content will be presented to the user. The weights applied to video content can be predefined or dynamically adjusted according to the behavior of the user (or a population of users). Higher weighted content can then be loaded in preference to lower weighted content.

In one example of predefined weighting, historical statistics of user behavior, past interactions and selections, and other suitable data can be used to determine the probability that particular content will be viewed by a particular user. Weights can then be applied to the content based on the determined probabilities, such that highly-viewed content will be prioritized in buffering.

In one example of dynamic weighting, a user that makes minimal or no changes to his field of view over a period of time is likely to continue that behavior. Consequently, time is weighted more heavily than space. In other words, video content within the user's field of view and corresponding fields of view in parallel tracks or branching video options (and optionally within a small proximate area surrounding the user's field of view) is buffered at a higher rate and/or further into the future than video content in larger proximate areas surrounding the user's field of view. In contrast, if the user changes his field of view frequently, the loading of video content for larger areas proximate to the user's field of view is prioritized over the loading of more future video content for a smaller area. As another example, when the user switches to a new video, that video can be weighted more heavily for loading, with respect to both time and loading area. Thus, the user's observed behavior can dynamically affect which video content and how much of that video content is retrieved, relative to other video content.

With some presentations of large scale videos, such as in virtual reality experiences, the user is provided with a simulated three-dimensional environment and, so, in addition to intelligently buffering media content, as described above, it can be preferable to perform transitions among videos in a manner that does not undesirably alert the user to the transitions.

Figure 9A:
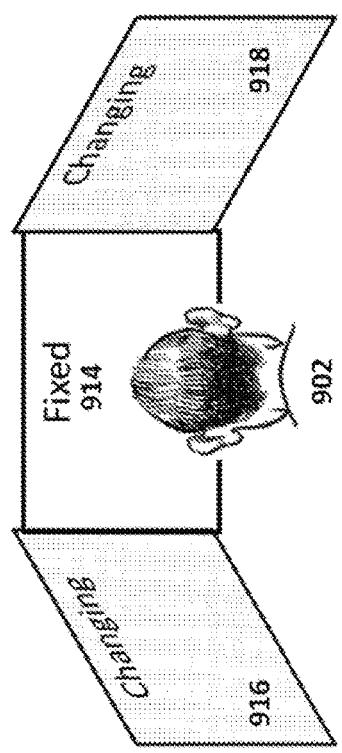
FIGS. 9A-9C depict video cuts based on changes in a user's field of view.
Figure 9B:
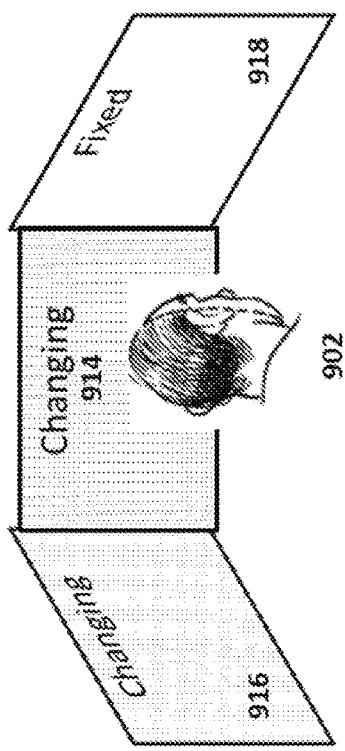
Figure 9C:
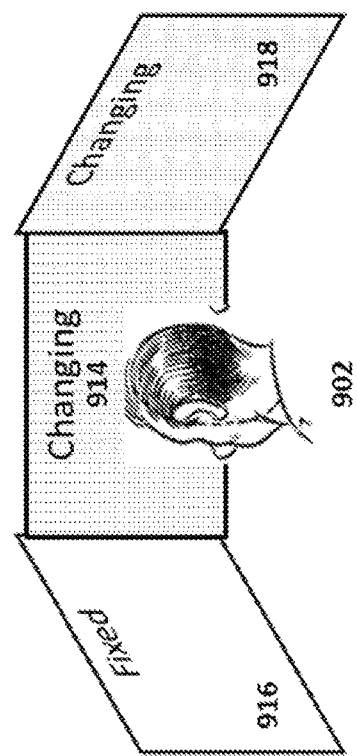

Various techniques are contemplated for performing such seamless experience transitions, for example, a particular sub-video can be cut or changed to a different sub-video when outside (at least partially) of the field of view of the user. Referring to FIGS. 9A-C, user 902 is viewing a large scale video including sub-video areas 914, 916, and 918. In FIG. 9A, the user 902 is looking directly ahead, placing sub-video area 914 directly within his field of view. Sub-video area 914 remains fixed in that the media content in sub-video area 914 does not, e.g., switch to different video content in a different sub-video, but rather continues the currently playing video (or seamlessly joined video segments). Because sub-video areas 916 and 918 are at least partially outside the user's field of view, changes can be made in those sub-video areas 916, 918, including changes that would result in the user 902 noticing the change (e.g., as might occur if a new video suddenly causes an object to appear on screen, or the video switches from one resolution to another).

Similarly, in FIG. 9B, when the user 902 looks to his right, placing sub-video area 918 in his field of view and sub-video areas 914 and 916 at least partially outside his field of view, sub-video area 918 can be fixed and sub-video areas 914 and 916 can be changed, if desired. Further, in FIG. 9C, when the user 902 looks to his left, placing sub-video area 916 in his field of view and sub-video areas 914 and 918 at least partially outside his field of view, sub-video area 916 can be fixed and sub-video areas 914 and 918 can be changed.

In one example of the above technique, the large scale video being viewed by the user 902 represents the user's view when looking out the windows of a car, namely, sub-video area 914 is the view out of the windshield, and sub-video areas 916 and 918 are the views out of the left and right windows, respectively. While video content in sub-video area 914 is playing and within the user's field of view (e.g., simulating a driving experience), a choice can be presented to the user 902 as to what car he would like to see on the road, Car A or Car B. If the user chooses Car A, sub-video area 916 is changed to a sub-video that shows Car A driving by, and the user 902 is directed to look to his left. If, instead, the user chooses Car B, sub-video area 918 is changed to a sub-video that shows Car B driving by, and the user 902 is directed to look to his right.

When a video within a user's field of view needs to be changed to a different video, it can be difficult to do so without the user noticing the transition. Accordingly, another technique for performing a seamless experience transition involves determining a point or period of time during the video, in a predefined and/or dynamic manner, at which the user's ability to notice a change in video is lower relative to other points of time in the video.

Figure 10:
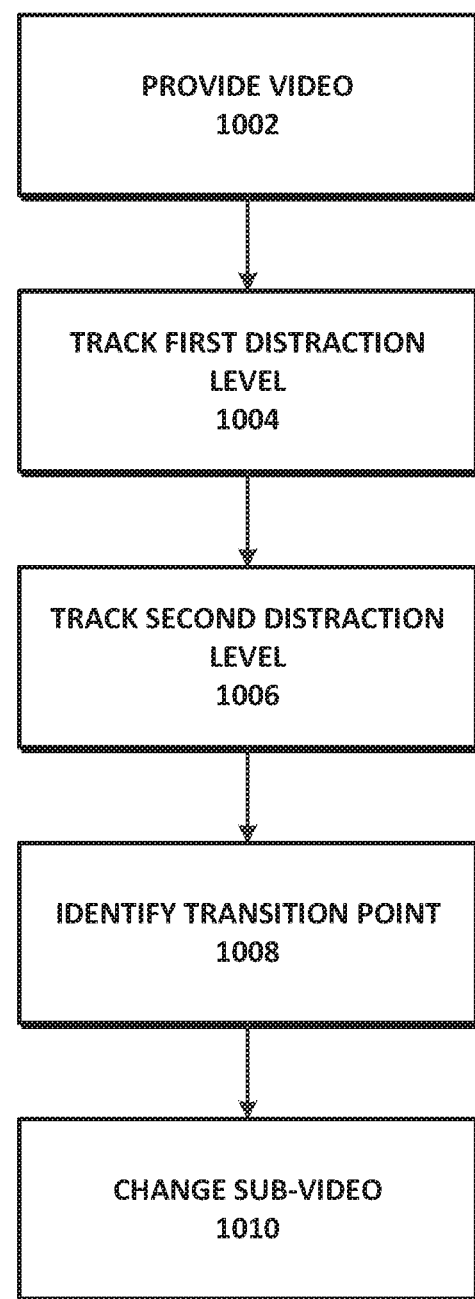
FIG. 10 depicts a method for seamless video transitions based on user distraction.

FIG. 10 depicts one implementation of this technique. In STEP 1002, a large scale video is provided for presentation to a user. The large scale video can include multiple sub-videos such as described herein. Various distraction levels relating to the media content and user are tracked at the user's device 110 and/or by a remote server, such as content server 102 or application server 106. Specifically, in this implementation, a distraction level based on content in the video is tracked (STEP 1004). This content distraction level can be based on, for example, object movement, object occlusion (e.g., something moves in front of the object, or the object moves behind something), visual or audio noise (e.g., an action scene with increased movement of persons, vehicles, etc., and loud sound effects), and/or other distracting occurrences in the media content. In other words, content in the video that is likely to distract the user results in an increase in the measurement of this distraction level relative to other, less distracting portions of the video. This distraction level can be automatically pre-determined (e.g., by analyzing the video prior to playback), can be automatically determined in real-time (e.g., using real-time audio and video analysis), and/or can be manually set for particular points in a video by, e.g., a content editor with knowledge of the content. Regardless of the manner of determining the distraction level, a content editor can provide intended distractions in media content (e.g., by adding sound effects played behind the user, adding background movement in the video, and so on).

Further, in this implementation, a distraction level based on actions of the user during presentation of the video is tracked (STEP 1006). This user action distraction level can be based on, for example, the user changing his field of view, the user focusing on a particular portion of the video, the user moving his head or other body part(s) in a particular direction, and/or other actions taken by the user that would tend to distract him from the playing video. When the user is engaging in such actions (or is expected to be engaging in such actions), the measurement of this distraction level rises higher relative to when the user is engaging in no such actions or less distracting actions. This distraction level can be preset by, e.g., a content editor who expects the user to be performing a particular action at a particular point in the video (e.g., looking in a particular direction or at a particular object), and/or can be determined automatically in real-time (e.g., using sensors on the user's device that track movement and other actions).

In STEP 1008, a transition point or period is identified in the video at which one sub-video likely can be changed to another sub-video without alerting the user to the change and, in STEP 1010, the transition is made at the point or during the period. If desirable, the transition can be made immediately at the identified transition point or within a specified time range of the point. In some implementations, the identification of a transition point is based on one or more distraction level measurements exceeding a threshold, which can be predefined. For example, if a particular distraction level has a measured value between 1 and 10, the system may require a distraction level to reach at least 7 before changing a video. As another example, the system may require the combination of two distraction levels (each having a possible measurement between 1 and 10, inclusive) to reach at least 15. In the event that a video must be changed during a particular time period, but the total distraction level does not exceed the threshold during that period, the video can, in some instances, be changed during the highest point of distraction during the period (if such knowledge is available), or at the end of the period, with the understanding that the user may notice the change.

Figure 11:
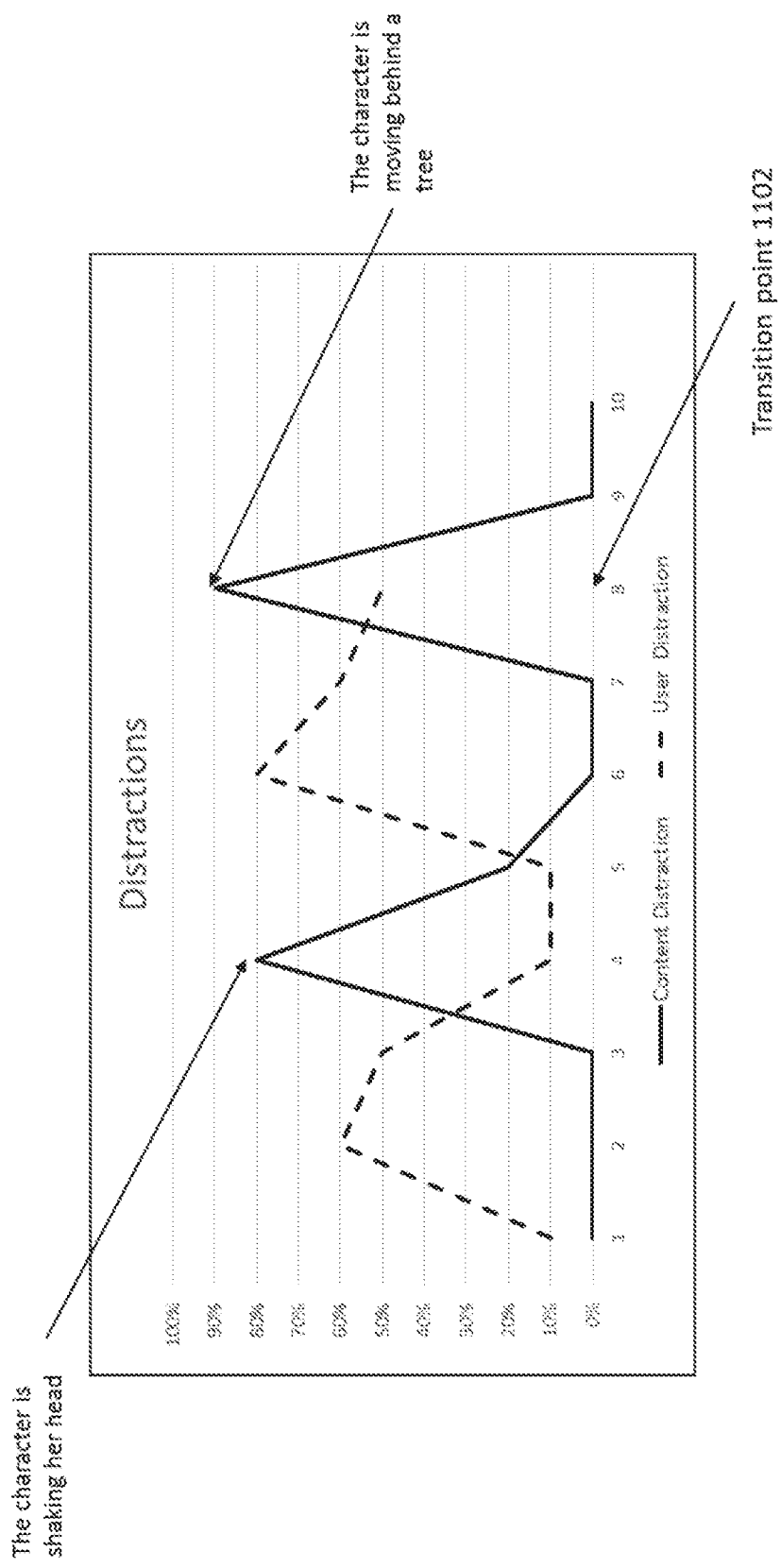
FIG. 11 depicts example distraction levels during a video presentation.

FIG. 11 depicts measurements of the content distraction level and user action distraction level described above over the duration of a particular video. In this example, the content distraction levels are known prior to playback of the video, whereas the user action distraction levels are determined as the video is playing. As the video is playing (time is represented by the horizontal axis), the distraction levels vary in intensity (represented by a percentage of distraction between 0-100% in the vertical axis) depending on what is occurring in the video (content distraction) and how the user is behaving (user distraction). For example, at time 4 seconds, a character in the video shakes her head at the user, resulting in a content-based distraction. Similarly, at time 8 seconds, the character moves behind a tree, causing even higher increase in content distraction level. At times of elevated user interaction (e.g., physical movement, change in field of view, etc., by the user), increased levels of user distraction are observed, such as at times 2 and 6 seconds. At the point 1102 during the video where the combination of both distraction levels is higher relative to the combination of both distraction levels at other points, the likelihood that the user is unlikely to notice a change in video is correspondingly higher. Here, the video is played for 8 seconds, at which point the combined distraction level meets or exceeds a threshold (e.g., 140% distraction level), and the switch in video is made.

One of skill in the art will appreciate that the techniques disclosed herein are applicable to a wide variety of media presentations. Several examples are now provided, however, many possible scenarios are contemplated. In one example immersive video presentation, a scene taking place in a large open space, such as a cityscape, includes visible "hotspots" scattered about the space (e.g., on the tops of buildings). By interacting with a particular hotspot (e.g., by focusing or pointing), the user is transported to a viewing point at the simulated physical location corresponding to the hotspot. In another example, a futuristic eye-scanner approaches the user and requests authentication. By focusing on the eye scanner for several seconds, the user is able to unlock a door. If the user does not complete the virtual eye scan, the door stays locked and the video unfolds in a different manner. In yet another example, a video presented in simulated three-dimensional space includes a character that beckons the user to follow the character's finger or select particular objects. Parts of the video can change depending on whether the user follows the character's instructions. In a further example, when the user moves around in a virtual space or zooms his view to get closer to an object emitting sound, the sound can increase in volume while other audio effects grow quieter.

Although the systems and methods described herein relate primarily to audio and video presentation, the invention is equally applicable to various streaming and non-streaming media, including animation, video games, interactive media, and other forms of content usable in conjunction with the present systems and methods. Further, there can be more than one audio, video, and/or other media content stream played in synchronization with other streams. Streaming media can include, for example, multimedia content that is continuously presented to a user while it is received from a content delivery source, such as a remote video server. If a source media file is in a format that cannot be streamed and/or does not allow for seamless connections between segments, the media file can be transcoded or converted into a format supporting streaming and/or seamless transitions.

While various implementations of the present invention have been described herein, it should be understood that they have been presented by example only. Where methods and steps described above indicate certain events occurring in certain order, those of ordinary skill in the art having the benefit of this disclosure would recognize that the ordering of certain steps can be modified and that such modifications are in accordance with the given variations. For example, although various implementations have been described as having particular features and/or combinations of components, other implementations are possible having any combination or sub-combination of any features and/or components from any of the implementations described herein.

What is claimed is:

1. A computer-implemented method comprising:
   storing at least a portion of an interactive video presentation comprising a plurality of sub-videos each comprising prerecorded video content, each sub-video associated with one of a plurality of fields of view;
   identifying a first field of view of a user viewing the video;
   loading one or more first sub-videos for presentation within the first field of view, wherein the one or more first sub-videos each comprise prerecorded video content;
   loading a plurality of second sub-videos associated with one or more fields of view proximate to the first field of view for potential presentation within the one or more fields of view proximate to the first field of view, wherein the plurality of second sub-videos each comprise prerecorded video content, and wherein the loading of the second sub-videos comprises prioritizing the loading of different ones of the second sub-videos based on which fields of view proximate to the first field of view the user has a greater probability of viewing, wherein the probability is based on historical statistics regarding actual viewing data;
   identifying a change in the field of view of the user to a second field of view;
   identifying a subplurality of the second sub-videos, each sub-video in the subplurality being associated with the second field of view, each sub-video in the subplurality further being associated with one or more nodes in a branching tree structure representing the interactive video presentation, wherein the branching tree structure comprises a plurality of different branches, each branch comprising a plurality of nodes that form a predefined traversable path through the interactive video presentation;
   receiving a first interaction of the user;
   transitioning, based on the first user interaction, from a current node in the branching tree structure to a particular one of the nodes of the branching tree structure having one or more sub-videos in the subplurality associated therewith; and
   loading the one or more sub-videos in the subplurality that are associated with the particular node for presentation within the second field of view.

2. The method of claim 1, wherein a particular sub-video, of the plurality of sub-videos, comprises a plurality of video frames, each frame comprising a portion of a frame of a larger video.

3. The method of claim 1, wherein a particular sub-video, of the plurality of sub-videos, comprises a plurality of video frames, each frame comprising a first portion at a first resolution and a second portion at a second resolution lower than the first resolution.

4. The method of claim 1, wherein the change in the field of view is based on a second interaction of the user with the video presentation.

5. The method of claim 4, wherein the second interaction comprises a head movement and/or an eye movement.

6. The method of claim 1, further comprising loading one or more third sub-videos associated with one or more fields of view proximate to the second field of view.

7. The method of claim 6, wherein the loading of the one or more third sub-videos is performed at an increased speed relative to further loading of the one or more second sub-videos.

8. The method of claim 6, further comprising stopping loading of the one or more first sub-videos.

9. The method of claim 1, wherein the one or more first sub-videos comprise a sub-video for immediate presentation within the first field of view and one or more different sub-videos for potential presentation within the first field of view.

10. The method of claim 9, further comprising identifying a transition in presentation within the first field of view, the transition being from the sub-video for immediate presentation to one of the one or more different sub-videos, the transition being based on a second interaction of the user.

11. The method of claim 10, wherein the second interaction comprises a head movement, an eye movement, speech, a hand movement, an arm movement, and/or an input from a control device.

12. The method of claim 9, wherein the loading of the one or more different sub-videos is based on a current field of view of the user and/or a probability that the user will have a particular field of view.

13. The method of claim 1, wherein the one or more second sub-videos comprise a sub-video for immediate presentation within the second field of view and one or more other sub-videos for potential presentation within the second field of view.

14. The method of claim 1, further comprising associating a weight with each sub-video being loaded based on a probability of that sub-video being viewed by the user, wherein a loading speed of a particular sub-video is based at least in part on the weight associated therewith.

15. A system comprising:
at least one memory storing computer-executable instructions; and
at least one processor for executing the instructions stored on the at least one memory, wherein execution of the instructions programs the at least one processor to perform operations comprising:
storing at least a portion of an interactive video presentation comprising a plurality of sub-videos each comprising prerecorded video content, each sub-video associated with one of a plurality of fields of view;
identifying a first field of view of a user viewing the video;
loading one or more first sub-videos for presentation within the first field of view, wherein the one or more first sub-videos each comprise prerecorded video content;
loading a plurality of second sub-videos associated with one or more fields of view proximate to the first field of view for potential presentation within the one or more fields of view proximate to the first field of view, wherein the plurality of second sub-videos each comprise prerecorded video content, and wherein the loading of the second sub-videos comprises prioritizing the loading of different ones of the second sub-videos based on which fields of view proximate to the first field of view the user has a greater probability of viewing, wherein the probability is based on historical statistics regarding actual viewing data;
identifying a change in the field of view of the user to a second field of view;
identifying a subplurality of the second sub-videos, each sub-video in the subplurality being associated with the second field of view, each sub-video in the subplurality further being associated with one or more nodes in a branching tree structure representing the interactive video presentation, wherein the branching tree structure comprises a plurality of different branches, each branch comprising a plurality of nodes that form a predefined traversable path through the interactive video presentation;
receiving a first interaction of the user;
transitioning, based on the first user interaction, from a current node in the branching tree structure to a particular one of the nodes of the branching tree structure having one or more sub-videos in the subplurality associated therewith; and
loading the one or more sub-videos in the subplurality that are associated with the particular node for presentation within the second field of view.

16. The system of claim 15, wherein a particular sub-video, of the plurality of sub-videos, comprises a plurality of video frames, each frame comprising a portion of a frame of a larger video.

17. The system of claim 15, wherein a particular sub-video, of the plurality of sub-videos, comprises a plurality of video frames, each frame comprising a first portion at a first resolution and a second portion at a second resolution lower than the first resolution.

18. The system of claim 15, wherein the change in the field of view is based on a second interaction of the user with the video presentation.

19. The system of claim 18, wherein the second interaction comprises a head movement and/or an eye movement.

20. The system of claim 15, wherein the operations further comprise loading one or more third sub-videos associated with one or more fields of view proximate to the second field of view.

21. The system of claim 20, wherein the loading of the one or more third sub-videos is performed at an increased speed relative to further loading of the one or more second sub-videos.

22. The system of claim 20, wherein the operations further comprise stopping loading of the one or more first sub-videos.

23. The system of claim 15, wherein the one or more first sub-videos comprise a sub-video for immediate presentation within the first field of view and one or more different sub-videos for potential presentation within the first field of view.

24. The system of claim 23, wherein the operations further comprise identifying a transition in presentation within the first field of view, the transition being from the sub-video for immediate presentation to one of the one or more different sub-videos, the transition being based on a second interaction of the user.

25. The system of claim 24, wherein the second interaction comprises a head movement, an eye movement, speech, a hand movement, an arm movement, and/or an input from a control device.

26. The system of claim 23, wherein the loading of the one or more different sub-videos is based on a current field of view of the user and/or a probability that the user will have a particular field of view.

27. The system of claim 15, wherein the one or more second sub-videos comprise a sub-video for immediate presentation within the second field of view and one or more other sub-videos for potential presentation within the second field of view.

28. The system of claim 15, wherein the operations further comprise associating a weight with each sub-video being loaded based on a probability of that sub-video being viewed by the user, wherein a loading speed of a particular sub-video is based at least in part on the weight associated therewith.

* * * * *